US011421090B2

(12) United States Patent
Chazot et al.

(10) Patent No.: US 11,421,090 B2
(45) Date of Patent: Aug. 23, 2022

(54) SYSTEMS, DEVICES, AND METHODS FOR PROMOTING IN SITU POLYMERIZATION WITHIN NANOMATERIAL ASSEMBLIES

(71) Applicant: Massachusetts Institute of Technology, Cambridge, MA (US)

(72) Inventors: Cécile A. C. Chazot, Somerville, MA (US); Anastasios John Hart, Waban, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 189 days.

(21) Appl. No.: 16/663,313

(22) Filed: Oct. 24, 2019

(65) Prior Publication Data

US 2020/0131326 A1    Apr. 30, 2020

Related U.S. Application Data

(60) Provisional application No. 62/749,751, filed on Oct. 24, 2018.

(51) Int. Cl.
*C08J 5/24*    (2006.01)
*C08L 1/02*    (2006.01)

(52) U.S. Cl.
CPC .    *C08J 5/24* (2013.01); *C08L 1/02* (2013.01); *C08J 2477/00* (2013.01)

(58) Field of Classification Search
CPC ............. C08J 5/24; C08J 2477/00; C08L 1/02
See application file for complete search history.

(56) References Cited

U.S. PATENT DOCUMENTS

| | | | |
|---|---|---|---|
| 2,708,617 | A | 5/1955 | Magat et al. |
| 4,814,082 | A | 3/1989 | Wrasidlo |
| 5,627,217 | A | 5/1997 | Rilling et al. |
| 6,426,134 | B1 | 7/2002 | Lavin et al. |
| 6,900,264 | B2 | 5/2005 | Kumar et al. |
| 8,262,943 | B2 | 9/2012 | Meng et al. |
| 2003/0180526 | A1 | 9/2003 | Winey et al. |
| 2011/0024698 | A1 | 2/2011 | Worsley et al. |
| 2012/0282453 | A1 | 11/2012 | Wang et al. |
| 2020/0131326 | A1 | 4/2020 | Chazot et al. |

OTHER PUBLICATIONS

Zhao et al., "Liquid Imbibition in Ceramic-Coated Carbon Nanotube Films," Langmuir, vol. 32, No. 48, pp. 12686-12692, 2016 (7 pages).
Zhao et al., "Vibration-assisted infiltration of nano-compounds to strengthen and functionalize carbon nanotube fibers," Carbon, vol. 101, pp. 114-119, 2016 (6 pages).
Zheng et al., "Effect of chemisorption on the interfacial bonding characteristics of carbon nanotube-polymer composites," Polymer, vol. 49, Issue 3, pp. 800-808, 2008.
Zimm, B.H., "Dynamics of polymer molecules in dilute solution: Viscoelasticity, flow birefringence and dielectric loss," The Journal of Chemical Physics, vol. 24, pp. 269-278, 1956 (11 pages).
Zhang et al., "Enhanced dielectric and mechanical properties in chlorine-doped continuous CNT sheet reinforced sandwich polyvinylidene fluoride film," Carbon 107, pp. 405-414, 2016 (10 pages).
Liu et al., "Strengthening carbon nanotube fibers with semi-crystallized polyvinyl alcohol and hot-stretching," Composites Science and Technology, vol. 164, pp. 290-295, 2018 (6 pages).
Liu et al., "Ultrastrong carbon nanotube/bismaleimide composite film with super-aligned and tightly packing structure," Composites Science and Technology, vol. 117, pp. 176-182, 2015 (7 pages).
Lu et al., "Improving mechanical properties of carbon nanotube fibers through simultaneous solid-state cycloaddition and crosslinking," Nanotechnology, vol. 28, No. 14, 2017 (10 pages).
Lv et al., "Carbon fabric-aligned carbon nanotube/MnO2/conducting polymers ternary composite electrodes with high utilization and mass loading of MnO2 for super-capacitors," Journal of Power Sources 220, 2012, pp. 160-168 (9 pages).
Ma et al., "Dispersion and functionalization of carbon nanotubes for polymer-based nanocomposites: A review," Composites Part A: Applied Science and Manufacturing, vol. 41, Issue 10, pp. 1345-1367, 2010.
Ma et al., "Dispersion, interfacial interaction and re-agglomeration of functionalized carbon nanotubes in epoxy composites," Carbon 48, 2010, pp. 1824-1834 (11 pages).
Ma et al., "High-Strength Composite Fibers: Realizing True Potential of Carbon Nanotubes in Polymer Matrix through Continuous Reticulate Architecture and Molecular Level Couplings," Neno Letters vol. 9 No. 9, 2009, pp. 2855-2861 (7 pages).
Maeno et al., "Adhesive Behavior of Single Carbon Nanotubes," Applied Physics Express 3, 2010 (3 pages).
Mallakpour et al., "Surface functionalization of carbon nanotubes: fabrication and applications," RSC Advances, vol. 6, pp. 109916-109935, 2016 (20 pages).
Manoharan et al., "The interfacial strength of carbon nanofiber epoxy composite using single fiber pullout experiments," Nanotechnology 20, 2009, pp. 1-5.

(Continued)

*Primary Examiner* — Edward J Cain
(74) *Attorney, Agent, or Firm* — Barnes & Thornburg LLP

(57) ABSTRACT

The present disclosure is directed to synthesizing a nanomaterial-polymer composite via in situ interfacial polymerization. A nanomaterial is exposed to a solution having a first solute dissolved in an aqueous solvent to uniformly, or substantially uniformly, distribute the solvent throughout the porosity of the network of the nanomaterial. The nanomaterial is then exposed to a second solution having a second solute dissolved in an organic solvent, which is substantially immiscible with the first solvent, with the first solute reacting with the second solute. The first and second solutions can be stirred, or otherwise moved with respect to each other, to facilitate transport of the second solution throughout the nanomaterial to promote reaction of the polymer within the nanomaterial to produce a polymer composite having uniform morphology.

20 Claims, 5 Drawing Sheets

(56) References Cited

OTHER PUBLICATIONS

Meng et al., "Forming Crystalline Polymer-Nano Interphase Structures for High-Modulus and High-Tensile/Strength Composite Fibers," Macromolecular Materials and Engineering, vol. 299, Issue 2, pp. 144-153, 2014 (10 pages).
Meshot et al., "Engineering Vertically Aligned Carbon Nanotube Growth by Decoupled Thermal Treatment of Precursor and Catalyst," ACS Nano, vol. 3, pp. 24977-2486, 2009 (10 pages).
Mikhalchan et al., "Aligned carbon nanotube-epoxy composites: the effect of nanotube organization on strength, stiffness, and toughness," Journal of Materials Science, vol. 51, pp. 10005-10025, 2016 (21 pages).
Miller et al., "Increased Tensile Strength of Carbon Nanotube Yarns and Sheets through Chemical Modification and Electron Beam Irradiation," ACS Applied Materials & Interfaces, vol. 6, No. 9, pp. 6120-6126, 2014 (7 pages).
Minus et al., "Interfacial Crystallization in Gel-Spun Poly (vinyl alcohol)/Single-Wall Carbon Nanotube Composite Fibers," Macromolecular Chemistry and Physics, vol. 210, Issue 21, pp. 1799-1808, 2009 (10 pages).
Minus et al., Single wall carbon nanotube templated oriented crystallization of poly (vinyl alcohol), Polymer, vol. 47, Issue 11, pp. 3705-3710, 2006 (6 pages).
Morgan, P , "Carbon Fibers and their Composites," Taylor & Francis Group, CRC Press, Boca Raton, FL, 2005 (1174 pages).
Mu et al., "Improved Load Transfer in Nanotube/Polymer Composites with Increased Polymer Molecular Weight," The Journal of Physical Chemistry C, vol. 111, No. 48, pp. 17923-17927, 2007 (5 pages).
Newcomb et al., "Reinforcement efficiency of carbon nanotubes and their effect on crystal-crystal slip in poly(ether ketone)/carbon nanotube composite fibers," Composites Science and Technology 147, 2017, pp. 116-125 (10 pages).
Nie et al., "Interfacial Load Transfer in Polymer/Carbon Nanotube Nanocomposites with a Nanohybrid Shish Kebab Modification," ACS Appl. Mater. Interfaces 2014, 6, pp. 14886-14893 (8 pages).
Ning et al., "New insight on the interfacial interaction between multiwalled carbon nanotubes and elastomers," Composites Science and Technology, vol. 142, pp. 214-220, 2017 (7 pages).
Nuriel et al., "Direct measurement of multiwall nanotube surface tension," Chemical Physics Letters, vol. 404, Issues 4-6, pp. 263-266, 2005 (4 pages).
Ottiger et al., "Strong N?H···? Hydrogen Bonding in Amide? Benzene Interactions," J. Phs. Chem. B 2009, 113, pp. 2937-2943 (7 pages).
Paci et al., "Shear and Friction between Carbon Nanotubes in Bundles and Yarns," Nano Letters, vol. 14, pp. 6138-6147, 2014 (10 pages).
Park et al., "Effect of oxygen plasma treatment on the mechanical properties of carbon nanotube fibers," Materials Letters, vol. 156, pp. 17-20, 2015 (4 pages).
Park et al., "High-modulus and strength carbon nanotube fibers using molecular cross-linking," Carbon, vol. 118, pp. 413-421, 2017 (9 pages).
Park et al., "Mechanical and electrical properties of thermochemically cross-linked polymer carbon nanotube fibers," Composites Part A: Applied Science and Manufacturing, vol. 91, Part 1, pp. 222-228, 2016 (7 pages).
Peigney et al., "Specific Surface Area of Carbon Nanotubes and Bundles of Carbon Nanotubes," Carbon, vol. 39, Issue 4, pp. 507-514, 2001 (8 pages).
Peng et al., "Highly aligned carbon nanotube/polymer composites with much improved electrical conductivities," Chemical Physics Letters, vol. 471, Issues 1-3, pp. 103-105, 2009 (3 pages).
Peng et al., "Molecular simulations of the influence of defects and functionalization on the shear strength of carbon nanotube-epoxy polymer interfaces," Computational Materials Science, vol. 126, pp. 204-216, 2017 (13 pages).

Pramanik et al., "Molecular engineering of interphases in polymer / carbon nanotube composites to reach the limits of mechanical performance," Composites Science and Technology, vol. 166, pp. 86-94, 2018 (9 pages).
Probst et al., "Nucleation of polyvinyl alcohol crystallization by single-walled carbon nanotubes," Polymer 45, pp. 4437-4443, 2004 (7 pages).
Puglia et al., "Effects of single-walled carbon nanotube incorporation on the cure reaction of epoxy resin and its detection by Raman spectroscopy," Diamond and Related Materials, vol. 12, Issues 3-7, pp. 827-832, 2003 (6 pages).
Qian et al., "Carbon nanotube grafted silica fibres: Chracterising the interface at the single fibre level" Composites Science and Technology, vol. 70 Issue 2, 2010 (23 pages).
Qian et al., "Load transfer and deformation mechanisms in carbon nanotube-polystyrene composites," Applied Physics Letters, vol. 76, pp. 2868-2870, 2000 (4 pages).
Qian et al., "Load transfer and mechanism in carbon nanotube ropes," Composites Science and Technology 63, 2003, pp. 1561-1569 (9 pages).
Qu et al., "Enhancement of mechanical properties of buckypapers/polyethylene composites by microwave irradiation," Composites Science and Technology, vol. 164, pp. 313-318, 2018 (6 pages).
Rahimian-Koloor, et al., "Effect of CNT structural defects on the mechanical properties of CNT/Epoxy nanocomposite," Physica B: Condensed Matter, vol. 540, pp. 16-25, 2018 (10 pages).
Raravikar et al., "Synthesis and Characterization of Thickness-Aligned Carbon Nanotube-Polymer Composite Films," Chemistry Materials vol. 17. No 5, 2005, pp. 974-983 (10 pages).
Razal et al., "Arbitrarily Shaped Fiber Assemblies from Spun Carbon Nanotube Gel Fibers," Advanced Functional Materials, vol. 17, Issue 15, pp. 2918-2924, 2007 (7 pages).
Ren et al., "Synthesis of Large Arrays of Well-Aligned Carbon Nanotubes on Glass," Science vol. 282, 1998, pp. 1105-1107 (4 pages).
Ritchie, R.O., "The conflicts between strength and toughness," Nature Materials, vol. 10, pp. 817-822, 2011 (6 pages).
Roh et al., "Characterization of the surface energies of functionalized multi-walled carbon nanotubes and their interfacial adhesion energies with various polymers," Polymer, vol. 55, Issue 6, pp. 1527-1536, 2014.
Rouse, P.E., "A theory of the linear viscoelastic properties of dilute solutions of coiling polymers," The Journal of Chemical Physics, vol. 21, pp. 1272-1280, 1953 (10 pages).
Ryu et al., "High-Strength Carbon Nanotube Fibers Fabricated by Infiltration and Curing of Mussel-Inspired Catecholamine Polymer," Advanced Materials, 2011, pp. 1971-1975 (5 pages).
Salvetat et al., "Mechanical Properties of Carbon Nanotubes," Applied Physics A, vol. 69, Issue 3, pp. 255-260, 1999 (6 pages).
Sammalkorpi et al., "Mechanical properties of carbon nanotubes with vacancies and related defects," Physical Review 70, 2004 (8 pages).
Sandler et al., "A comparative study of melt spun polyamide-12 fibres reinforced with carbon nanotubes and nanofibres," Polymer, vol. 45, Issue 6, pp. 2001-2015, 2004 (15 pages).
Schawe et al., "Nucleation efficiency of fillers in polymer crystallization studied by fast scanning calorimetry: Carbon nanotubes in polypropylene," Polymer, vol. 116, pp. 160-172, 2017 (13 pages).
Sepúlveda et al., "Full elastic constitutive relation of non-isotropic aligned-CNT/PDMS flexible nanocomposites," Nanoscale, 2013, 5, pp. 4847-4854 (8 pages).
Shaffer et al., "Fabrication and Characterization of Carbon Nanotube/Poly (vinyl alcohol) Composites," Advanced Materials, vol. 11, Issue 11, pp. 937-941, 1999 (5 pages).
Sheng et al., Crystallization Behavior of Poly(ethylene oxide) in Vertically Aligned Carbon Nanotube Array, Langmuir, vol. 34, pp. 3678-3685, 2018.
Silva et al., "Thermoplastic polyurethane nanocomposites produced via impregnation of long carbon nanotube forests," Macromolecular Materials and Engineering, vol. 296, Issue 1, pp. 53-58, 2011 (6 pages).

(56) References Cited

OTHER PUBLICATIONS

Song et al., "Processing and performance improvements of SWNT paper reinforced PEEK nanocomposites," Composites Part A: Applied Science and Manufacturing, vol. 38, Issue 2, pp. 388-392, 2007 (5 pages).

Song et al., "Structural Polymer-Based Carbon Nanotube Composite Fibers: Understanding the Processing-Structure-Performance Relationship," Materials, 2013, pp. 2543-2577 (35 pages).

Spitalsky et al., "Carbon nanotube-polymer composites: Chemistry, processing, mechanical and electrical properites," Progress in Polymer Science 35, pp. 357-401, 2010 (45 pages).

Suhr et al., "Continuous Carbon Nanotube Reinforced Composites," Nano Letters, 2008 (5 pages).

Sun, et al., "A modified Weibull model for tensile strength distribution of carbon nanotube fibers with strain rate and size effects," Applied Physics Letters 101, 2012 (5 pages).

Sun et al., "Developing Polymer Composite Materials: Carbon Nanotubes or Graphene?" Advanced Materials, vol. 25, Issue 37, pp. 5153-5176, 2013.

Tallury et al., "Molecular Dynamics Simulations of Polymers with Stiff Backbones Interacting with Single-Walled Carbon Nanotubes," The Journal of Physical Chemistry B, vol. 114, pp. 9349-9355, 2010 (8 pages).

Tashiro et al., "Calculation of Three-Dimensional Elastic Constants of Polymer Crystals. 2. Application to Orthorhombic Polyethylene and Poly(vinyl alcohol)," Macromolecules, vol. 11, No. 5, pp. 914-918, 1978 (5 pages).

Tao et al., "Effects of carbon nanotube fillers on the curing processes of epoxy resin-based composites," Journal of Applied Polymer Science, vol. 102, Issue 6, pp. 5248-5254, 2006 (7 pages).

Tran et al., "Direct Measurement of the Wetting Behavior of Individual Carbon Nanotubes by Polymer Melts: The Key to Carbon Nanotube-Polymer Composites," Nano Letters, vol. 8, No. 9, pp. 2744-2750, 2008 (7 pages).

Tran et al., "Super-strong and highly conductive carbon nanotube ribbons from post-treatment methods," Carbon, vol. 99, pp. 407-415, 2016 (9 pages).

Treacy et al., "Exceptionally high Young's modulus observed for individual carbon nanotubes," Nature vol. 381, pp. 678-680, 1996 (3 pages).

Tsuda et al., "Direct measurements of interfacial shear strength of multi-walled carbon nanotube/PEEK composite using a nanopullout method," Composites Science and Technology, vol. 71, Issue 10, pp. 1295-1300, 2011 (6 pages).

Vega et al., "Rheology and reptation of linear polymers. Ultrahigh molecular weight chain dynamics in the melt," Journal of Rheology, vol. 48, pp. 663-678, 2004 (17 pages).

Viet et al., "A new formula for the effective Young's modulus and Shear modulus of multiwall carbon nanotubes," Academia Journal of Biotechnology, vol. 5, Issue 9, pp. 147-155, 2017 (9 pages).

Vigolo et al., "Macroscopic Fibers and Ribbons of Oriented Carbon Nanotubes," Science, vol. 290, pp. 1331-1334, 2000 (5 pages).

Wagner et al., "Nanocomposites: issues at the interface," Materials Today, 2004 (5 pages).

Walters, et al., "Elastic strain of freely suspended single-wall carbon nanotube ropes," Applied Physics Letters vol. 74 No. 25, 1999 (4 pages).

Wang et al., "Effect of carbon nanotube length on thermal, electrical and mechanical properties of CNT/bismaleimide composites," Carbon, vol. 53, pp. 145-152, 2013 (8 pages).

Wang et al., "Enhancement of interfacial adhesion and dynamic mechanical properties of poly(methyl methacrylate)/multiwalled carbon nanotube composites with amine-terminated poly(ethylene oxide)," Carbon 44, pp. 613-617, 2006 (5 pages).

Wang et al., "Processing and property investigation of single-walled carbon nanotube (SWNT) buckypaper/epoxy resin matrix nanocomposites," Composites Part A: Applied Science and Manufacturing, vol. 35, Issue 10, pp. 1225-1232, 2004 (8 pages).

Wang et al., "The extraordinary reinforcing efficiency of single-walled carbon nanotubes in oriented poly(vinyl alcohol) tapes," Nanotechnology, vol. 18, No. 45, 2007 (10 pages).

Wang et al., "Controlled nanostructure and high loading of single-walled carbon nanotubes reinforced polycarbonate composite," Nanotechnology, vol. 18, 2007 (8 pages).

Wang et al., "Polypropylene nanocomposites with polymer coated multiwall carbon nanotubes," Polymer, vol. 100, pp. 244-258, 2016 (15 pages).

Wang et al., "Structure and rheological behavior of polypropylene interphase at high carbon nanotube concentration," Polymer 150, pp. 10-25, 2018 (16 pages).

Wang et al., "Ultrastrong, Stiff and Multifunctional Carbon Nanotube Composites," Materials Research Letters, vol. 1, pp. 19-25, 2013 (8 pages).

Wei et al., "Optimal Length Scales Emerging from Shear Load Transfer in Natural Materials: Application to Carbon-Based Nanocomposite Design," American Chemical Society vol. 6 No. 3, pp. 2333-2344, 2012 (12 pages).

Wirth et al., "Surface properties of vertically aligned carbon nanotube arrays," Diamond and Related Materials, vol. 17, Issues 7-10, pp. 1518-1524, 2008 (7 pages).

Wu, Souheng. "Surface and Interfacial Tensions of Polymer Melts. II. Poly(methyl methacrylate), Poly (n-butyl methacrylate), and Polystyrene," Journal of Physical Chemistry vol. 74 No. 3, 1970 (7 pages).

Yadav et al., "High Performance Fibers from Carbon Nanotubes: Synthesis, Characterization, and Applications in Composites—A Review," Ind. Eng. Chem. Res. 2017, 56, pp. 12407-12437 (31 pages).

Yamaura et al., "Mechanical Properties of Films of Poly (Vinyl Alcohol) Derived from Vinyl Trifluoroacetate," Journal of Applied Polymer Science, vol. 31, pp. 493-500, 1986 (8 pages).

Yang et al., "Amino acid analogues bind to carbon nanotube via ?-? interactions: Comparison of molecular mechanical and quantum mechanical calculations," Journal of Chemical Physics, vol. 136, 2012 (11 pages).

Yang et al., "Cure Behavior and Thermal Stability Analysis of Multiwalled Carbon Nanotube/Epoxy Resin Nanocomposites," Journal of Applied PolymerScience, vol. 110, 2008 (9 pages).

Yang et al., "Composite films based on aligned carbon nanotube arrays and a poly(N-isopropyl acrylamide) hydrogel," Advanced Materials, vol. 20, pp. 2201-2205, 2008 (5 pages).

Yang et al., "Fabrication and characterization of poly (vinyl alcohol)/carbon nanotube melt-spinning composites fiber," Progress in Natural Science: Materials International, vol. 25, Issue 5, pp. 437-444, 2015 (8 pages).

Yang et al., "Interactions between Polymers and Carbon Nanotubes: A Molecular Dynamics Study," The Journal of Physical Chemistry B, vol. 109, No. 20, pp. 10009-10014, 2005 (6 pages).

Yuan et al., "Covalent cum Noncovalent Funtionalizations of Carbon Nanotubes for Effective Reinforcement of a Solution Cast Composite Film," ACS Applied Materials & Interfaces, vol. 4, pp. 2065-2073, 2012 (9 pages).

Yun et al., "Controllable functionalization of single-wall carbon nanotubes by in situ polymerization method for organic photovoltaic devices," Synthetic Metals, vol. 158, Issues 21-24, pp. 977-983, 2008 (7 pages).

Yu et al., "Controlled Sliding and Pullout of Nested Shells in Individual Multiwalled Carbon Nanotubes," J. Phys. Chem. B. vol. 104, pp. 8764-8767, 2000 (4 pages).

Yu et al., "Tensile Loading of Ropes of Single Wall Carbon Nanotubes and their Mechanical Properties," Physical Review Letters vol. 84 No. 24, 2000 (4 pages).

Zhang et al., "High-fidelity characterization on anisotropic thermal conductivity of carbon nanotube sheets and on their effects of thermal enhancement of nanocomposites," Nanotechnology, vol. 29, 2018 (11 pages).

Zhang et al., "Multifunctional Carbon Nanotube Yarns by Downsizing an Ancient Technology," Science, vol. 306, Issue 5700, pp. 1358-1361, 2004 (5 pages).

(56) References Cited

OTHER PUBLICATIONS

Zhang et al., "Nanocomposites of Carbon Nanotube Fibers Prepared by Polymer Crystallization," ACS Applied Materials & Interfaces, vol. 2, No. 6, pp. 1642-1647, 2010 (6 pages).
Zhang et al., "Polymer-infiltrated aligned carbon nanotube fibers by in situ polymerization," Macromolecular Rapid Communications, vol. 30, Issue 22, pp. 1936-1939, 2009 (4 pages).
Zhang et al., Surface-induced polymer crystallization in high volume fraction aligned carbon nanotube-polymer composites, Macromolecular Chemistry and Physics, vol. 211, Issue 9, pp. 1003-1011, 2010 (9 pages).
Zhang et al., "Ultrastrong, Stiff, and Lightweight Carbon-Nanotube Fibers," Advanced Materials, vol. 19, pp. 4198-4201, 2007 (4 pages).
Zhang et al., "Wettability of carbon nanotube fibers," Carbon, vol. 122, pp. 128-140, 2017 (13 pages).
Acquah, et al. "Strategies to Successfully Cross-Link Carbon Nanotubes," Intech Open, 2011 (18 pages).
Alig et al., "Establishment, morphology and properties of carbon nanotube networks in polymer melts," Polymer 53, pp. 4-28, 2012 (25 pages).
Allaoui et al., "Mechanical and electrical properties of a MWNT/epoxy composite," Composites Science and Technology, vol. 62, Issue 15, pp. 1993-1998, 2002 (6 pages).
Arash et al., "Mechanical properties of carbon nanotube/polymer composites," Scientific Reports, 2014, pp. 1-8.
Andrews et al., "Carbon Nanotube Polymer Composites," Current Opinion in Solid State and Materials Science, vol. 8, Issue 1, pp. 31-37, 2004.
Asis et al., "Length dependent behavior of a carbon nanotube interacting at liquid-air interface," Applied Physics Letters 93, 2008 (4 pages).
Bai et al., "Carbon nanotube bundles with tensile strength over 80 GPA," Nature Nanotechnology, vol. 13, pp. 589-595, 2018 (9 pages).
Banerjee et al., "Mechanical properties of single-walled carbon nanotube reinforced polymer composites with varied interphase's modulus and thickness: A finite elements analysis study," Computational Materials Science 114, 2016, pp. 209-218 (10 pages).
Barber et al., "Static and Dynamic Wetting Measurements of Single Carbon Nanotubes," Physical Review Letters, vol. 92, 2004 (4 pages).
Barber et al., "Measurement of carbon nanotube-polymer interfacial strength," Applied Physics Letters, vol. 82 No. 23, 2003 (4 pages).
Barber et al., "Interfacial fracture energy measurements for multi-walled carbon nanotubes pulled from a polymer matrix," Composites Science and Technology, pp. 2283-2289, 2004 (7 pages).
Barber et al., "Fracture Transitions at a Carbon-Nanotube/Polymer Interface," Advanced Materials, vol. 18, pp. 83-87, 2006 (5 pages).
Baskaran et al., "Noncovalent and nonspecific molecular interactions of polymers with multiwalled carbon nanotubes," Chemistry of Materials, vol. 17, No. 13, pp. 3389-3397, 2005 (9 pages).
Beese et al., "Bio-inspired carbon nanotube-polymer composite yarns with hydrogen bond-mediated lateral interactions," ACS Nano, vol. 7, No. 4, pp. 3434-3446, 2013 (13 pages).
Behabtu et al., "Carbon nanotube-based neat fibers," NanoToday, vol. 3, Issues 5-6, pp. 24-34, 2008 (11 pages).
Behabtu et al., "Strong, Light, Multifunctional Fibres of Carbon Nanotubes with Ultrahigh Conductivity," Science, vol. 339, pp. 182-187, 2013 (6 pages).
Bhattacharyya et al., "Crystallization and orientation studies in polypropylene/single wall carbon nanotube composite," Polymer, vol. 44 Issue 8, pp. 2373-2377, 2003 (5 pages).
Bhattacharyya et al., "Studies on Surface Tension of Poly(Vinyl Alcohol): Effect of Concentration, Temperature, and Addition of Chaotropic Agents," Journal of Applied Polymer Science, vol. 93, pp. 122-130, 2004 (10 pages).
Boncel et al., "Enhancement of the mechanical properties of directly spun CNT fibers by chemical treatment," ACS Nano, vol. 5, pp. 9339-9344, 2011 (6 pages).
Boncel et al., "Shear-induced crystallsation of molten isotactic polypropylene within the intertube channels of aligned multi-wall carbon nanotube arrays towards structurally controlled composites," Materials Letters, vol. 116, pp. 53-56, 2014 (4 pages).
Bose et al., "Assessing the strengths and weaknesses of various types of pre-treatments of carbon nanotubes on the properties of polymer/carbon nanotubes composites: A critical review," Polymer 51, pp. 975-993, 2010 (19 pages).
Boyer et al., "Microfabrication with smooth thin carbon nanotube composite sheets," Materials Research Express, vol. 4, 2017 (10 pages).
Bradford et al., "A novel approach to fabricate high volume fraction nanocomposites with long aligned carbon nanotubes," Composites Science and Technology, vol. 70, Issue 13, pp. 1980-1985, 2010 (6 pages).
Cadek et al., "Reinforcement of Polymers with Carbon Nanotubes: The Role of Nanotube Surface Area," Nano Letters, vol. 4, No. 2, pp. 353-356, 2004 (4 pages).
Can et al., "Processing and Characterization of Carbon Nanotube Composites," NASA Technical Reports Server, 2014 (15 pages).
Cebeci et al., "Multifunctional properties of high volume fraction aligned carbon nanotube polymer composites with controlled morphology," Composites Science and Technology, vol. 69, Issues 15-16, pp. 2649-2656, 2009 (8 pages).
Cha et al., "Fabrication of uniform vertically-aligned carbon nanotube-polymer composite thin films by capillary flow Intrusion," Japanese Journal of Applied Physics, vol. 57, No. 11, 2018 (5 pages).
Chazot et al., "Understanding and Control of Interactions Between Carbon Nanotubes and Polymers for Manufacturing of High-Performance Composite Materials," Dept. of Mechanical Engineering and Department of Materials Science and Engineering, Massachusetts Institute of Technology (17 pages).
Chen et al., "A review of the interfacial characteristics of polymer nanocomposites containing carbon nanotubes," Royal Society of Chemistry Adv., vol. 8, pp. 28048-28085, 2018 (38 pages).
Chen et al., "Quantitative nanomechanical characterization of the van der Waals interfaces between carbon nanotubes and epoxy," Carbon, vol. 82, pp. 214-228, 2015 (15 pages).
Choi et al., "Noncovalent functionalization of multi-walled carbon nanotubes with hydroxyl group-containing pyrene derivatives for their composites with polycarbonate," Carbon 95, 2015, pp. 91-99 (9 pages).
Cheng et al., "Carbon nanotube/epoxy composites fabricated by resin transfer molding," Carbon, vol. 48, Issue 1, pp. 260-266, 2010 (7 pages).
Cheng et al., "Functionalized Carbon-Nanotube Sheet/Bismaleimide Nanocomposites: Mechanical and Electrical Performance Beyond Carbon-Fiber Composites," Small, vol. 6, pp. 763-767, 2010 (5 pages).
Cheng et al., "High Mechanical Performance Composite Conductor: Multi-Walled Carbon Nanotube Sheet/Bismaleimide Nanocomposites," Advanced Functional Materials, vol. 19, pp. 3219-3225, 2009 (7 pages).
Chhowalla et al., "Growth process conditions of vertically aligned carbon nanotubes using plasma enhanced chemical vapor deposition," Journal of Applied Physics, vol. 90, 2001 (11 pages).
Chwastiak et al., "High Carbon Fibers from Mesophase Pitch," Carbon vol. 17, 1977, pp. 49-53 (5 pages).
Chowreddy et al., "Recycled polyethylene terephthalate/carbon nanotube composites with improved processability and performance," Journal of Materials Science, vol. 53, pp. 7017-7029, 2018 (13 pages).
Cividanes et al., "Influence of Carbon Nanotubes on Epoxy Resin Cure Reaction Using Different Techniques: A Comprehensive Review," Polymer Engineering & Science, vol. 54, Issue 11, pp. 2461-2470, 2014 (10 pages).
Coleman et al., "Geometric constraints in the growth of nanotube-templated polymer monolayers," Applied Physics Letters, vol. 84, p. 798-800, 2004 (4 pages).
Coleman et al., "Improving the mechanical properties of single-walled carbon nanotube sheets by intercalation of polymeric adhesives," Applied Physics Letters, vol. 82, 2003 (4 pages).

(56) References Cited

OTHER PUBLICATIONS

Coleman et al., "Small but strong: A review of the mechanical properties of carbon nanotube-polymer composites," Carbon, vol. 44, Issue 9, pp. 1624-1652, 2006 (29 pages).
Coleman et al., "High-Performance Nanotube-Reinforced Plastics: Understanding the Mechanism of Strength Increase," Advanced Functional Materials vol. 14 No. 8, 2004 (8 pages).
Cornwell et al., "Very-high-strength (60-GPA) carbon nanotube fiber design based on molecular dynamics simulations," Journal of Chemical Physics, vol. 134, 2011 (9 pages).
Cox, H.L., "The elasticity and strength of paper and other fibrous materials," British Journal of Applied Physics, vol. 3, No. 3, pp. 72-79, 1952 (9 pages).
Dalton et al., "Super-tough carbon-nanotube fibres," Nature, vol. 423, p. 703, 2002 (1 page).
Dassios et al., "Polymer-nanotube interaction in MWCNT / poly (vinyl alcohol) composite mats," Carbon, vol. 50, Issue 11, pp. 4291-4294, 2012 (4 pages).
Dassios, K.G., "Poly(Vinyl Alcohol)-Infiltrated Carbon Nanotube Carpets," Materials Sciences and Applications, 2012, 3, pp. 658-663 (6 pages).
Davijani et al, "Ordered wrapping of poly (methyl methacrylate) on single wall carbon nanotubes," Polymer, vol. 70, pp. 278-281, 2015.
De Gennes, P.G., "Reptation of a polymer chain in the presence of fixed obstacles," The Journal of Chemical Physics, vol. 55, pp. 572-579, 1971 (9 pages).
De Volder et al., "Fabrication and electrical integration of robust carbon nanotube micropillars by self-directed elastocapillary densification," Journal of Micromechanics and Microengineering, vol. 21, No. 4, 2011 (13 pages).
Demczyk et al., "Direct mechanical measurement of the tensile strength and elastic modulus of multiwalled carbon nanotubes," Materials Science and Engineering: A, vol. 334, Issues 1-2, pp. 173-178, 2002 (6 pages).
Deng et al., "Effects of anisotropy, aspect ratio, and nonstraightness of carbon nanotubes on thermal conductivity of carbon nanotube composites," American Institute of Physics, 2007 (4 pages).
Desai et al., "Mechanics of the interface for carbon nanotube-polymer composites," Thin-Walled Structures vol. 43, pp. 1787-1803, 2005 (17 pages).
Ding et al., "Direct Observation of Polymer Sheathing in Carbon Nanotube-Polycarbonate Composites," Nano Letters, vol. 3, No. 11, pp. 1593-1597, 2003 (5 pages).
Dujardin et al., "Wetting of Single Shell Carbon Nanotubes," Advanced Materials, vol. 10, Issue 17, pp. 1472-1475, 1998 (4 pages).
Fang et al., "Enhanced carbon nanotube fibers by polyimide," Applied Physics Letters, vol. 97, 2010 (4 pages).
Frankland, et al., "Molecular Simulation of the Influence of Chemical Cross-Links on the Shear Strength of Carbon Nanotube-Polymer Interfaces," The Journal of Physical Chemistry B, vol. 106, pp. 3046-3048, 2002 (3 pages).
Fujigaya et al., "Non-covalent polymer wrapping of carbon nanotubes and the role of wrapped polymers as functional dispersants," Science Technology Advanced Materials 16, 2015 (22 pages).
Fukae et al., "Fiber-Forming Properties of Poly (vinyl alcohol) Derived from Poly (vinyl pivalate)," Sen'I Gakkaishi, vol. 52, pp. 76-82, 1996 (7 pages).
Gao et al., "Scalable Functional Group Engineering of Carbon Nanotubes by Improved One-Step Nitrene Chemistry," Chem. Mater. 2009, 21, pp. 360-370 (11 pages).
Gao et al., "Selective Wrapping and Supramolecular Structures of Polyfluorene-Carbon Nanotube Hybrids," ACS Nano, vol. 5, No. 5, pp. 3993-3999, 2011 (7 pages).
Gao et al., "A shear-lag model for carbon nanotube-reinforced polymer composites," International Journal of Solids and Structures, vol. 42, Issues 5-6, pp. 1649-1667, 2005 (19 pages).
García et al., "Fabrication of composite microstructures by capillarity-driven wetting of aligned carbon nanotubes with polymers," Nanotechnology, vol. 18, No. 16, 2007 (11 pages).
Garcia et al., "Fabrication and Multifunctional Properties of High Volume Fraction Aligned Carbon Nanotube Thermoset Composites," Journal of Nano Systems and Technology vol. 1 No. 1, 2009 (12 pages).
Grady et al., "Nucleation of Polypropylene Crystallization by Single-Walled Carbon Nanotubes," Journal of Physical Chemistry B 2002, 106, pp. 5852-5858 (7 pages).
Grossman et al., "Hierarchical Toughening of Nacre-Like Composites," Advanced Functional Materials, vol. 29, pp. 1-9, 2019 (9 pages).
Grossman et al., "Quantifying the role of mineral bridges on the fracture resistance of nacre-like composites," PNAS vol. 115 No 50, 2018, pp. 12698-12703 (6 pages).
Gui et al., "A Facile Route to Isotropic Conductive Nanocomposites by Direct Polymer Infiltration of Carbon Nanotube Sponges," Acs Nano 2011, pp. 4276-4283 (8 pages).
Gui et al., "Carbon Nanotube Sponges," Advanced Materials 22, 2010, pp. 617-621 (5 pages).
Guo et al., "Aligned carbon nanotube/polymer composite fibers with improved mechanical strength and electrical conductivity," Journal of Materials of Chemistry 22, 2012 (6 pages).
Guru et al., "Effect of temperature and functionalization on the interfacial properties of CNT reinforced nanocomposites," Applied Surface Science 349, 2015, pp. 59-65 (7 pages).
Haggenmueller et al., "Single wall carbon nanotube/polyethylene nanocomposites: Nucleating and templating polyethylene crystallites," Macromolecules, vol. 39, No. 8, pp. 2964-2971, 2006 (8 pages).
Han et al., "Bio-Inspired Aggregation Control of Carbon Nanotubes for Ultra-Strong Composites," Scientific Reports, vol. 5, Article No. 11533, 2015 (9 pages).
Han et al., "Computational modeling of elastic properties of carbon nanotube / polymer composites with interphase regions. Part I : Micro-structural characterization and geometric modeling," Computational Materials Science, vol. 81, pp. 641-651, 2014 (11 pages).
Hirsch, Andreas., "Functionalization of Single-Walled Carbon Nanotubes," Andew. Chem. Int. Ed. 2002, 41, No. 11. pp. 1853-1859 (7 pages).
Hu et al., "Ultrastrong and excellent dynamic mechanical properties of carbon nanotube composites," Composite Science and Technology, vol. 141, pp. 137-144, 2017 (8 pages).
Iijima, S, "Helical Microtubules of Graphitic Carbon," Nature, vol. 354, pp. 56-58, 1991 (3 pages).
International Search Report and Written Opinion for International Application No. PCT/US2019/057966, dated Jul. 15, 2020 (16 pages).
Jung et al., "How can we make carbon nanotube yarn stronger?" Composites Science and Technology, vol. 166, pp. 95-108, 2018 (14 pages).
Kaiser et al., "Process-morphology scaling relations quantify self-organization in capillary densified nanofiber arrays," Physical Chemistry Chemical Physics, vol. 20, pp. 3876-3881, 2018 (7 pages).
Kalfon-Cohen et al., "Synergetic effects of thin plies and aligned carbon nanotube interlaminar reinforcement in composite laminates," Composites Science and Technology, vol. 166, pp. 160-168, 2018 (9 pages).
Kar et al., "Noncovalent ?-? Stacking and CH—? Interactions of Aromatics on the Surface of Single-Wall Carbon Nanotubes: An MP2 Study," The Journal of Physical Chemistry C, vol. 112, No. 50, pp. 20070-20075, 2008 (6 pages).
Kim et al., "Fabrication of flexible, aligned carbon nanotube/polymer composite membranes by in-situ polymerization," Journal of Membrane Science, vol. 460, pp. 91-98, 2014 (8 pages).
Kim et al., "Mechanical properties enhanced by solid-state coupling reaction for molecular covalent bridges of carbon nanotube fibers," Materials Letters, vol. 211, pp. 243-246, 2018 (4 pages).
Knowles, Rob. Aromatic Interactions. Macmillan Group Meeting, Feb. 9, 2005 (32 pages).
Koval'chuk et al., "Effect of Carbon Nanotube Functionalization on the Structural and Mechanical Properties of Polypropylene/MWCNT Composites," Macromolecules, vol. 41, pp. 7536-7542, 2008 (7 pages).

(56) References Cited

OTHER PUBLICATIONS

Koziol et al., "Aligned carbon nanotube-polystyrene composites prepared by in situ polymerisation of stacked layers," Composites Science and Technology 71, 2011, pp. 1606-1611 (6 pages).
Koziol et al., "High-Performance Carbon Nanotube Fiber," Science vol. 318, 2007 (5 pages).
Kwon et al., "Torsional behaviors of polymer-infiltrated carbon nanotube yarn muscles studied with atomic force microscopy," Nanoscale, 2012, pp. 2489-2496 (8 pages).
Laurent et al.,"The weight and density of carbon nanotubes versus the number of walls and diameter," Carbon, vol. 48, Issue 10, pp. 2994-2996, 2010 (3 pages).
Lee et al., "Carbon nanotube dispersion and exfoliation in polypropylene and structure and properties of the resulting composites," Polymer 49, 2008, pp. 1831-1840 (10 pages).
Lee et al., "Nanoengineered In Situ Cure Status Monitoring Technique Based on Carbon Nanotube Network," AIAA Scitech 2019 Forum (14 pages).
Liao et al., "One-step functionalization of carbon nanotubes by free-radical modification for the preparation of nanocomposite bipolar plates in polymer electrolyte membrane fuel cells," Journal of Materials Chemistry, 2008, pp. 3993-4002 (10 pages).
Liang et al., "Densification of chlorine-doped continuous CNT sheet/polyvinylidene fluoride sandwich film and improvement of the mechanical and dielectric properties," Nanotechnology, vol. 29, 2018 (13 pages).
Lidston, D.L., "Synthesis, Characterization, and Mode I Fracture Toughness of Aligned Carbon Nanotube Polymer Matrix Nanocomposites," Massachusetts Institute of Technology, 2011 (215 pages).
Liu et al., "Characterization of enhanced interfacial bonding between epoxy and plasma functionalized carbon nanotube films," Composites Science and Technology, vol. 145, pp. 114-121, 2017 (8 pages).
Liu, Peng., "Modifications of carbon nanotubes with polymers," European Polymer Journal 41, 2005, pp. 2693-2703 (11 pages).
Liu et al., "Polymer/Carbon Nanotube Nano Composite Fibers—A Review," ACS Applied Materials & Interfaces, vol. 6, No. 9, pp. 6069-6087, 2014 (19 pages).
Liu et al., "Scratch-Resistant, Highly Conductive, and High-Strength Carbon Nanotube-Based Composite Yarns," ACS Nano, vol. 4, No. 10, pp. 5827-5834, 2010 (8 pages).
Liu et al., "Stable non-covalent functionalisation of multi-walled carbon nanotubes by pyrene-polyethylene glycol through ?-? stacking," New Journal of Chemistry, vol. 33, pp. 1017-1024, 2009 (8 pages).
Boncel et al., "Infiltration of highly aligned carbon nanotube arrays with molten polystyrene," Materials Letters, vol. 65, Issue 14, pp. 2299-2303, 2011.
Buchheim et al., "Failure mechanism of the polymer in filtration of carbon nanotube forests," Nanotechnology, vol. 27, 2016.
Hiemenz et al., "Polymer Chemistry—Second Edition," 2007.
Huang et al., "A new and general fabrication of an aligned carbon nanotube/polymer film for electrode applications," Advanced Materials, vol. 23, Issue 40, pp. 4707-4710, 2011.
Jung et al., "Effect of polymer infiltration on structure and properties of carbon nanotube yarns," Carbon, vol. 88, pp. 60-69, 2015.
Kasaliwal et al., "4—Influence of Material and Processing Parameters on Carbon Nanotube Dispersion in Polymer Melts," Polymer-Carbon Nanotube Composites, Preparation, Properties and Applications, Woodhead Publishing Series in Composites Science and Engineering, pp. 92-132, 2011.
Khaneft et al., "Imbibition of polystyrene melts in aligned carbon nanotube arrays," Journal of Applied Physics, vol. 113, 2013.
Lata, S, "Dispersibility of carbon nanotubes in organic solvents: do we really have predictive models?" Journal of Nanoparticle Research, vol. 19, p. 211, 2017.
Lei et al., "Assembly Dependent Interfacial Property of Carbon Nanotube Fibers with Epoxy and its Enhancement via Generalized Surface Sizing," Advanced Engineering Materials, vol. 18, Issue 5, pp. 839-845, 2016.
Li et al., "Enhancement of carbon nanotube fibres using different solvents and polymers," Composites Science and Technology, vol. 72, Issue 12, pp. 1402-1407, 2012.
Liu et al., "Quantitative characterization of SWNT orientation by polarized Ramen spectroscopy," Chemical Physics Letters, vol. 378, Issues 3-4, pp. 257-262, 2003.
Mora et al., "Properties of composites of carbon nanotube fibres," Composites Science and Technology, vol. 69, Issue 10, pp. 1558-1563, 2009.
Naraghi et al., "Atomistic Investigation of Load Transfer Between DWNT Bundles "Crosslinked" by PMMA Oligomers," Advanced Functional Materials, vol. 23, Issue 15,pp. 1883-1892, 2013.
Odegard et al., "Carbon nanotube composites for structural applications," Composites Science and Technology, vol. 166, pp. 1-182, 2018.
Rahmat et al., "Carbon nanotube-polymer interactions in nanocomposites: A review," Composites Science and Technology, vol. 72, Issue 1, pp. 72-84, 2011.
Sakurada et al., "Relation between crystallinity and swelling of poly (vinyl alcohol)," Kobunshi Kagaku, vol. 12, p. 506, 1955.
Song et al., "Recent progress in interfacial polymerization," Materials Chemistry Frontiers, vol. 1, pp. 1028-1040, 2017.
Tallury et al., "Molecular Dynamics Simulations of Flexible Polymer Chains Wrapping Single-Walled Carbon Nanotubes," The Journal of Physical Chemistry B, vol. 114, No. 12, pp. 4122-4129, 2010.
Wardle et al., "Fabrication and characterization of ultrahigh-volume-fraction aligned carbon nanotube-polymer composites," Advanced Materials, vol. 20, Issue 14, pp. 2707-2714, 2008.
Whitfield et al., "Wool Fabric Stabilization by Interfacial Polymerization. Part I: Polyamides," Textile Research Journal, vol. 31, Issue 8, pp. 704-712, 1961.
Xie et al., "Dispersion and alignment of carbon nanotubes in polymer matrix: A review," Materials Science and Engineering: R: Reports, vol. 49, Issue 4, pp. 89-112, 2005.
Yao et al., "Recent advances in carbon-fiber-reinforced thermoplastic composites: A review," Composites Part B: Engineering, vol. 142, pp. 241-250, 2018.
Young et al., "Interfacial and internal stress transfer in carbon nanotube based nanocomposites," Journal of Materials Science, vol. 51, pp. 344-352, 2016.
Young et al., "Strong Dependence of Mechanical Properties on Fiber Diameter for Polymer-Nanotube Composite Fibers: Differentiating Defect from Orientation Effects," ACS Nano, vol. 4, No. 1,, pp. 6989-6997, 2010.
Zhao et al., "Highly Stable Carbon Nanotube/Polyaniline Porous Network for Multifunctional Applications," Applied Materials & Interfaces, vol. 8, No. 49, pp. 34027-34033, 2016.
Zhu et al., "Strong and stiff aramid nanofiber/carbon nanotube nanocomposites," ACS Nano, vol. 9, No. 3, pp. 2489-2501, 2015.

SYSTEMS, DEVICES, AND METHODS FOR PROMOTING IN SITU POLYMERIZATION WITHIN NANOMATERIAL ASSEMBLIES

CROSS REFERENCE TO RELATED APPLICATION

The present disclosure claims priority to U.S. Provisional Application No. 62/749,751, entitled "In Situ Polymerization within Nanomaterial Assemblies," which was filed on Oct. 24, 2019, and which is incorporated by reference herein in its entirety.

GOVERNMENT RIGHTS

This invention was made with Government support under Grant No. NNX17AJ32G awarded by NASA. The Government has certain rights in the invention.

FIELD

The present disclosure relates to systems, devices, and methods for synthesizing a polymer inside of a nanoporous medium, and more particularly relates to formation of highly-loaded nanomaterial-polymer composites by in situ interfacial polymerization to achieve substantially uniform or uniform morphology within nanomaterial structures.

BACKGROUND

Composite materials combining nanoporous materials, have been widely sought to achieve high strength, high toughness, and in some cases multifunctional performance. One example of such nanoporous materials are carbon nanotubes (CNTs), which exhibit outstanding mechanical, electrical, and thermal properties, and their nanometer-scale diameter and high aspect ratio enables load transfer to polymers via van der Waals, $\pi$ interactions, or covalent bonding. Despite the focus of conventional techniques on using CNTs as a filler to polymer matrices at low loadings, recent emphasis has been placed on processing methods that leverage organized CNT assembles, such as forests, sheets, or fibers, to achieve highly loaded CNT composites via polymer infiltration.

Infiltration of polymers into neat CNT structures, such as sheets and yarns, has proven effective to enhance CNT-CNT load transfer, and hence create a composite with improved Young's modulus and tensile strength as compared to the neat CNT structure. CNTs are commonly used as a reinforcement phase in composite systems because they are small (typically having diameters approximately in the range of about 1 nm to about 10 nm) and lightweight (e.g., having a density of approximately 1.3 $g/cm^3$), and exhibit extreme stiffness and strength (e.g., having a stiffness of approximately ~1 TPa; e.g., having a strength of approximately >100 GPa) substantially greater than the properties of any carbon fiber or metal. Common methods of creating CNT/polymer composites involve dispersing CNTs in a monomer or polymer solution, a time-and-energy-intensive process that can damage the CNT structure, degrading its mechanical properties. Moreover, such methods are typically limited to a maximum content of approximately 1-10 wt. % CNTs for the final composite material, and are prone to aggregation of the CNTs.

The common method used to obtain composite systems with a higher CNT content involves infiltrating a nanoporous CNT structure, such as a yarn or sheet obtained by floating catalyst chemical vapor deposition (CVD) synthesis, with a polymer dissolved at low concentration in a solvent, an uncured resin, or a polymer melt. Because the size of the oligomer or polymer chains is typically on the same order of magnitude as the porosity within the CNT structure, the macromolecules typically have low mobility into the CNT structure. For example, typical resins and polymers used in composite processing have characteristic molecular size comparable to CNT diameters, therefore making infiltration a slow process (sometimes involving soaking for hours or even days) that can be highly dependent on parameters such as polymer chain length, molecular structure, as well as the chemical interaction with its surroundings (CNTs, additional solvent, etc.). This approach results in highly heterogeneous structures with phase separation between polymer-rich and CNT-rich regions, as well as incomplete filling of the initial porosity. Agglomeration during infiltration of pre-made polymers or oligomers, as well as the creation of sub-micron voids acting as stress concentrators in the structure, contribute to significant weakening of the characteristics of the resultant composite system, often inhibiting its mechanical and electrical properties. Commercially, CNT-based composites are notably suited to complement existing carbon fiber (CF) composites such as by interlaminar toughening and grafting of CNTs on CFs.

Numerous techniques for fabrication of CNT-polymer composites exist for formation of polymers in a nonporous network, with each technique, despite having benefits, also having significant shortcomings. Melt processing is a widespread industrial technique and has been used to produce low-loading CNT composites at large scale, such as by bulk mixing. In melt processing, dedicated steps to remove impurities or solvents are not needed, and controlling the cooling rate also enables adjustment of the degree of crystallinity of the polymer, particularly in an interphase region. In the case of polypropylene and CNT forests with low density, melt infiltration can induce enhanced crystallization by a combination of shear stress occurring in the initial stage of infiltration multi-walled carbon nanotube (MWCNT) arrays by flowing molten polymer, and template-based growth of crystallites. Such enhanced crystallization due to shear stress results in a highly crystalline polymer and improved tensile properties for the final composite. However, composites obtained through polymer melt infiltration often feature poor mechanical properties. The high viscosity of the melt causes the CNTs to aggregate and/or results in occasional voids and polymer-rich regions that limit the composite strength. Partial infiltration is usually a consequence of the low mobility of the organic molecules forming a highly entangled melt, while phase separation is the result of CNT agglomeration due to capillary forces.

Alternate methods for fabricating CNT-polymer composites include pre-polymer infiltration in which fiber composite systems utilize pre-polymer mixtures that are subsequently mixed with a filler (nanoparticle, fibers, etc.) and cured. For instance, carbon fiber composites are typically processed by infiltration of resins that comprise monomers and short-chain polymers (oligomers), as well as smaller crosslinking agents and additives, in which the resin chemistry and thermal curing processes can be optimized for high modulus and tensile strength. Compared to direct melt infiltration, CNT composites that utilize this approach exhibit faster diffusion of the reactive species compared to melt infiltration. For example, a CNT network can be impregnated by the liquid resin for several hours before being cured at elevated temperature. However, the viscosity of pre-polymer resins it still quite high, and the resulting forces exerted during infiltration can cause CNT aggregation and phase separation. This can be highly dependent on the resin system used, and it is often difficult to predict whether a resin system will wet a CNT network well. Moreover, some epoxy-based resins have exhibited poor wetting of a CNT network, and capillary forces during evaporation of solvents may lead to voids in the composite. Moreover, the presence of a large amount of CNTs can influence the curing process by sterically hindering interaction between the monomers/oligomers and the curing agents, which can lead to heterogeneities of the composite where monomers at the vicinity of a CNT may polymerize at a different rate, resulting in a broad molecular weight distribution for the final polymer. However, the presence of CNTs may result in an acceleration or a slowdown of the polymerization reaction through a decrease or increase in the steric hindrance effect respectively. Moreover, introducing CNTs in the resin can result in faster thermal curing due to excellent CNT thermal conductivity, or catalytic effect due to the surface chemistry of the CNT. Lastly, some polymers exhibit significant shrinkage while curing, therefore disturbing the morphology of the CNT network.

Yet another approach of CNT composite fabrication by polymer infiltration uses a polymer dissolved in a solvent as the liquid phase. In this approach, the lower viscosity of polymer solutions, compared to polymer melts or pre-polymer resins, allows the polymer to be more easily infiltrated through the CNT network by immersion or spray coating. Additionally, adjusting the choice of solvent, as well as the polymer concentration and molecular weight allows tuning of the mobile phase viscosity. However, deficiencies of this approach include that the solvent being used as a carrier phase for polymer infiltration must be removed a posteriori, while use of a solvent can cause CNT aggregation during solvent evaporation due to capillary forces (e.g., elastocapillary aggregation) exerted by the receding meniscus. Further, heterogeneity of the final composite structure on the micrometer to millimeter scale is therefore a big challenge arising from polymer solution infiltration.

Accordingly, there is a need to create systems, devices, and methods for rapid and scalable synthesis of highly loaded nanomaterial-polymer composites having uniform morphology. Moreover, there is a further need for techniques that improve the properties of these composites due to local voids in the composite, phase separation, and lack of optimization of hierarchical load transfer between the polymer and any nanoporous materials, including CNTs.

SUMMARY

In one exemplary embodiment of a method of synthesizing a polymer within a nanoporous medium, the method includes exposing a nanoporous substrate to a first solvent having a first solute dissolved in the first solvent to allow the first solvent and solute to infiltrate the nanoporous substrate, and exposing the nanoporous substrate to a second solvent having a second solute dissolved in the second solvent to allow the second solvent and solute to travel through the porosity of the nanoporous substrate to react the second solute with the first solute to form the polymer. The second solvent is sufficiently immiscible with the first solvent.

The method can also include stirring the substrate while the substrate is exposed to the second solvent to assist the transport of the second solvent through the substrate where the first solute reacts with the second solute to form the polymer. The polymer can be formed at the interface between the first and second solvents or at the interface between the substrate and the second solvent while the substrate is disposed in the second solvent. A spacing between adjacent nanostructures in the nanoporous substrate can be approximately in the range of about 1 nanometer to about 100 nanometers, or more particularly approximately in the range of about 1 nanometer to about 10 nanometers.

The first solute and/or the second solute can include one or more of a monomer, a mixture of monomers, an oligomer, a mixture of oligomers, or a mixture of a monomer and an oligomer. In some embodiments, the first solvent can include water and the second solvent can include an organic solvent. The reaction of the first and second solutes can occur within the second solvent. In some embodiments, the second solvent can wet the substrate after the substrate is disposed in the second solvent to substantially displace the first solvent.

The second solvent can travel through the porosity of the nanoporous substrate faster than the first solvent travels through the porosity of the nanoporous substrate. In at least some embodiments, the substrate can be dried between exposure to the first solvent and exposure to the second solvent.

The method can include drying the substrate after removing the substrate from the first solvent and prior to disposing the substrate in the second solvent. The substrate can include one or more of cellulose, ceramic, metal, polymer, carbon nanotubes, graphene, silicon nanowires, or boron nitride nanotubes, in the form of a powder, foam, lattice, sheet, or yarn.

The method can further include rinsing the substrate in one or more additional solvents to remove byproduct or unreacted solutes from the substrate. The one or more additional solvents can include acetone and/or water. The method can also include collecting the polymer composite and trying the polymer composite. The first solute can be soluble in the second solvent.

The method can include disposing the substrate in the first bath for at least about 10 minutes and/or disposing the substrate in the second bath for at least about 5 minutes. In some embodiments, the method includes repeatedly disposing the substrate into the first bath and/or the second bath to increase a final polymer content of the polymer within a nanoporous medium.

In some embodiments, the method can include a mechanical force being applied to the substrate during or after disposing the substrate in the first solvent or in the second solvent. The mechanical force can be tensile or compressive.

One exemplary embodiment of a method of synthesizing a polymer composite includes disposing a nanomaterial substrate having a porous structure in a first bath that contains a first solvent, the first solvent having a first solute dissolved in the first solvent, removing the substrate from the first bath, and disposing the substrate in a second bath that contains a second solvent, the second solvent having a second solute dissolved in the second solvent. Disposing the substrate in the second bath reacts the first and second solutes to form a polymer composite. The second solvent is sufficiently immiscible with the first solvent.

The method can also include stirring the substrate in the second bath to assist the transport of the second solvent through the substrate, and to react the first solute with the second solute to form the polymer composite. The polymer composite can form at the interface between the first and second solvents or at the interface between the substrate and the second solvent while the substrate is disposed in the second solvent. A spacing between adjacent nanostructures in the nanomaterial substrate can be approximately in the range of about 1 nanometer to about 100 nanometers, or more particularly approximately in the range of about 1 nanometer to about 10 nanometers.

The first solute and/or the second solute can include one or more of a monomer, a mixture of monomers, an oligomer, a mixture of oligomers, or a mixture of a monomer and an oligomer. In some embodiments, the first solvent can include water and the second solvent can include an organic solvent. The reaction of the first and second solutes can occur within the second solvent. In some embodiments, the second solvent can wet the substrate after the substrate is disposed in the second solvent to substantially displace the first solvent.

The method can include drying the substrate after removing the substrate from the first solvent and prior to disposing the substrate in the second solvent. The substrate can include one or more of cellulose, ceramic, metal, polymer, carbon nanotubes, graphene, silicon nanowires, or boron nitride nanotubes, in the form of a powder, foam, lattice, sheet, or yarn.

The method can further include rinsing the substrate in one or more additional solvents to remove byproduct or unreacted solutes from the substrate. The one or more additional solvents can include acetone and/or water. The method can also include collecting the polymer composite and trying the polymer composite. The first solute can be soluble in the second solvent.

The method can include disposing the substrate in the first bath for at least about 10 minutes and/or disposing the substrate in the second bath for at least about 5 minutes. In some embodiments, the method includes repeatedly disposing the substrate into the first bath and/or the second bath to increase a final polymer content of the polymer composite.

In some embodiments, the method can include a mechanical force being applied to the substrate during or after disposing the substrate in the first bath or in the second bath. The mechanical force can be tensile or compressive.

One exemplary polymer composite can include a nanoporous material having a polymer substantially uniformly distributed throughout a structure of the material. The polymer is formed from a reaction of a first solute and a second solute within pores of the nanoporous material at a liquid-liquid interface within the nanoporous material In some embodiments, the solute includes one or more of a monomer, a mixture of monomers, an oligomer, a mixture of oligomers, and a mixture of a monomer and an oligomer. The first solute can include one or more of amines, piperazines, thiols, diols, acid halides (e.g., acyl chloride, or acid chloride, acyl fluoride, acyl bromide, or carbon suboxides). The nanoporous material can include one or more of cellulose, ceramics, metal foam, polymer fiber mat or foam, sheet, fiber, or yarn comprising carbon nanotubes, boron nitride nanotubes, or graphene. The polymer can include one or more of a polyamide, a polyurea, or nylon. In some embodiments, the nanoporous material can have a porosity approximately in the range of about 1 nanometer to about 10 nanometers.

BRIEF DESCRIPTION OF DRAWINGS

This disclosure will be more fully understood from the following detailed description taken in conjunction with the accompanying drawings, in which.

DETAILED DESCRIPTION

Figure 1A:
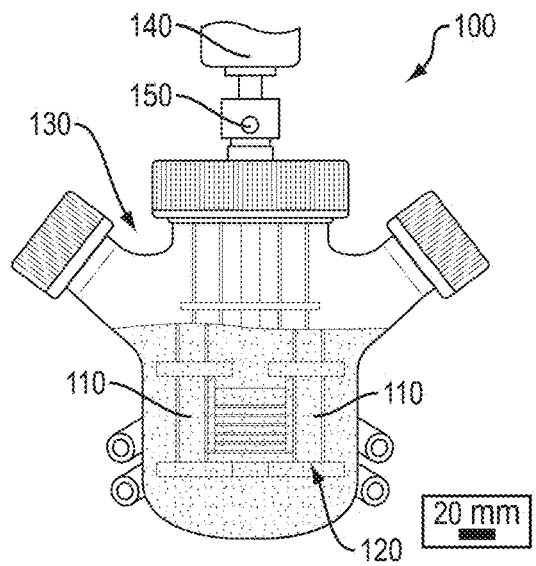
FIG. 1A is a perspective view of one exemplary embodiment of a system of synthesizing a polymer composite, the system including a flask.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

To the extent a term like "nanoporous" is used herein without a structural modifier, a person skilled in the art, in view of the present disclosure, will understand that it includes a nanomaterial having a porous network, with the porosity of the network typically being variable and/or uniform throughout the nanomaterial. Additionally, to the extent the terms "substrate" and "material" are described in the present disclosure, a person skilled in the art will recognize that these terms are used interchangeably. Further to the extent the terms "solutions" and "phases" are described in the present disclosure, a person skilled in the art will recognize that these terms are used interchangeably. Still further, to the extent compounds, sides, or steps are described as being "first" or "second," such numerical ordering is generally arbitrary, and thus such numbering can be interchangeable. For example, the terms "first solute" and "second solute" can refer to the order in which the substrate is exposed to solutes, with the terms "first" and "second" being able to be applied to various compounds, some of which can be interchanged in different embodiments so as to be a "first solute" in a given embodiment and a "second solute" in an alternate embodiment. Still further, in the present disclosure, like-numbered components of various embodiments generally have similar features when those components are of a similar nature and/or serve a similar purpose. The present disclosure includes some illustrations and descriptions that include prototypes or bench models. A person skilled in the art will recognize how to rely upon the present disclosure to integrate the techniques, systems, devices, and methods provided for into a product in view of the present disclosures.

The present disclosure generally relates to systems, devices, and methods for promoting in situ interfacial polymerization to synthesize a polymer within a nanoporous medium to form a polymer composite. Interfacial polymerization can be used synthesize a polymer within a network via a reaction that occurs at a liquid-liquid interface within the network to form a polymer composite that is dense, lightweight, and strong, and in some embodiments, having an attractive combination of one or more of mechanical strength, stiffness, electrical conductivity, thermal conductivity, and/or low density. In an exemplary embodiment of synthesizing a polymer composite, solutes can travel, transport, or infiltrate, through a nanoscale porosity of the nanoporous medium to subsequently react and form the polymer. Once the solutes fill the porosity, they can polymerize, e.g., react with one or more solutes, within the porosity to form the polymer composite. By starting from solutes, which can be approximately 10,000 times smaller than polymer macromolecules formed after polymerization, the materials can travel throughout the porosity of the nanomaterial to form a polymer composite having a tailored polymer content. A person skilled in the art will recognize that the tailored polymer content can establish uniform loading, though, in some embodiments, the volume fraction of the polymer content can vary from approximately 10% to approximately 100%.

One exemplary embodiment of a process for synthesizing the polymer composite can include exposing a nanomaterial substrate, or a nanoporous material, to a solution of a solvent having a solute dissolved therein to allow the solution to infiltrate the network to wet the substrate while carrying the solute throughout the porosity of the nanomaterial. The wet substrate can then be exposed to a second solution that includes another solvent, this solvent being immiscible with the previous solvent and having another solute dissolved therein. The solution can be stirred or otherwise mixed to increase the speed of travel of the second solution through the substrate. As the second solution enters the substrate, the solutes can react with one another within the nanomaterial to form a polymer composite. The polymer composite can then be removed from the solution, washed and dried to remove the solutions, byproducts, and unreacted solute therefrom, and dried to produce the final polymer composite. Alternate embodiments of the process can include a continuous process in which the substrate is disposed within multiple baths of solutions causing the polymer composite to be formed. Other ways of processing substrates by causing a first solute to react with a second solute to form a polymer composite in view of the present disclosures are also possible without departing from the spirit of the present disclosure.

Figure 1B:
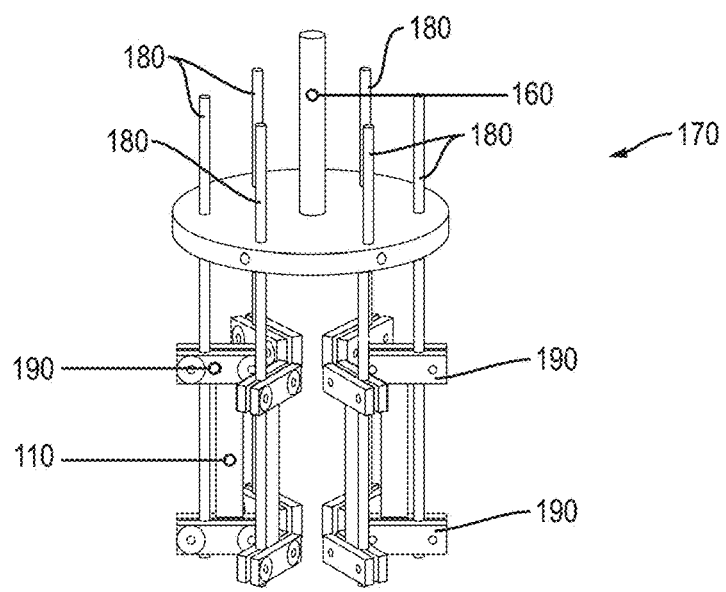
FIG. 1B is a perspective view of a carousel used in the flask of FIG. 1A, the carousel having a plurality of substrates attached thereto.
Figure 1C:
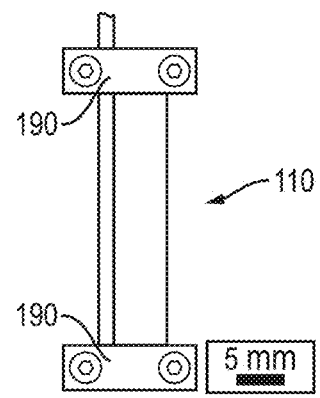
FIG. 1C is a side view of a substrate disposed within the carousel of FIG. 1B.

FIGS. 1A-1C illustrate an exemplary embodiment of a system 100 for synthesizing a nanomaterial-polymer composite. The system 100 can include one or more ribbons, or substrates, 110 disposed in a container for mixing with a solution 120. The system 100 can be configured to dispose, such as, by ways of non-limiting examples, dipping or soaking, the one or more substrates 110 in the solution 120 to expose the substrates 110 to the solution, which allows the solution to infiltrate the substrate 110.

As shown, the system 100 can include a flask 130 for retaining the solution 120 therein. The flask 130 can include a single solution, as shown, though in some embodiments, the flask 130 can retain a plurality of solutions therein. A person skilled in the art will recognize that the volume of the flask 130 can vary, though in some embodiments the flask 130 can have a volume that is large enough to allow multiple substrates 110 to be submerged therein. For example, as shown, the flask 130 can include six substrates 110 disposed therein, though five or less, or seven or more, substrates can be disposed therein. The substrates 110 can be fully or substantially fully submerged, as shown, to allow the solution to travel throughout the entirety of the network, though in some embodiments only portions of the substrate can be submerged if the composite is desired to be formed in only a portion of the substrate.

The solution 120 can include one or more solvents that include a substance therein. For example, the solution 120 can include one or more of water, glycerol, ethylene glycol, and/or an organic solvent (e.g., cyclohexanone, hexane, chloroform, tetrahydrofuran, benzene, carbon tetrachloride, and so forth) having the substances dissolved therein. The substances can be dissolved substantially uniformly, though in some embodiments a dispersion can be formed.

The solution 120 can include one or more solute(s) or therein. The solute(s) can include a monomer, a mixture of monomers, an oligomer, a mixture of oligomers, and/or a mixture of a monomer and an oligomer, and so forth. A person skilled in the art will recognize that the oligomers can include reactive groups at one or more ends thereof that have the same functional groups as those of the monomers, thereby promoting reaction with the monomers and/or other oligomers. The monomers can be dissolved and/or dispersed in the solvent to form the solution of varying solubility. Some non-limiting examples of monomers include amines, piperazines, thiols, diols, acid halides (e.g., acyl chloride, or acid chloride, acyl fluoride, acyl bromide, and/or carbon suboxides) Moreover, to the extent that the instant disclosure discusses the compounds in the solvents as monomers herein, other solutes such as (e.g., sodium carbonate, sodium chloride, sodium hydroxide, trihydroxy titanium stearate) and surface-active agents (e.g., sodium lauryl sulfate) can be used in lieu of, and/or in addition to, monomers.

The flask 130 can include a stirrer 140 for agitating the solution. For example, the flask 130 can be coupled to an overhead stirrer 140 for rotating the substrates 110 relative to the solution to facilitate transport of the solution throughout the substrates 110. Stirring of the solution when the substrates are disposed therein can assist with the transport of the solution through the substrates and/or facilitate in situ polymer formation within the substrate network, as described further below. A person skilled in the art will recognize that transport phenomena such as convection, diffusion, and/or imbibition can apply to the solution and the monomer that travel and/or infiltrate the network of the substrate 110. Although the illustrated embodiment uses a stirrer, carousel, and rotary shaft, a person skilled in the art will understand that there exist a multitude of alternate conditions under which the substrates can be exposed to the solution, including ultrasonication, vortex stirring, or tumbling. In some embodiments, the flask 130 can include a gasket 150. The gasket 150 can hold the carousel in place by engaging the rotary shaft 160, which allows rotation of the flask while keeping the solution sealed.

The stirrer 140 can be coupled to a rotary shaft 160 associated with the substrate that spins the substrates within the flask relative to the solution, as shown and discussed in FIG. 1B in greater detail below. More specifically, FIG. 1B illustrates an exemplary embodiment of a carriage or carousel 170 configured to attach to the stirrer 140 and to be rotated. The carousel 170 can include the rotary shaft 160 and one or more sample holders 180 that extend through a length of the carousel 170. Each of the sample holders 180 can be coupled to a substrate 110 for introduction into the flask 130. As shown, the carousel 170 can include six sample holders 180, each having a substrate 110 attached thereto, though it will be appreciated that five or fewer or seven or more sample shafts can be used. The sample holders 180 can be spaced apart from one another to prevent overlap between the substrates in instances where no overlap is desired.

FIG. 1C illustrates the substrate 110 used to form the nanomaterial-polymer composite attached to each sample holders 180 in greater detail. As shown, the nanomaterial can be disposed between clamps 190 of the sample shaft to suspend, and optionally stretch, the substrate 110 therebetween. CNTs, when formed into a network such as a sheet, yarn, mat, or other assembly, are one example of a nanoporous material which can be processed to create a composite article, resulting in a highly loaded nanomaterial-polymer composite. A person skilled in the art will recognize that although the instant disclosure discusses printing systems, devices, and methods of synthesizing CNT-polymer composites, the systems, devices, and methods generally discussed herein can be applied to any nanomaterial, regardless of its physical properties, assembled form, or surface chemistry to synthesize nanomaterial-polymer composites. For example, the nanomaterial can include nanotubes and/or nanowires of carbon, silicon, graphene oxide, graphene, boron nitride, cellulose, and so forth, to synthesize composites such as film, yarn, fiber, 'bucky paper', sponge, forests, materials with and without surface functionalization and/or coating, and other three-dimensional assemblies that include the nanostructures discussed above. It will be appreciated that depending on the choice of nanomaterial, its surface functionalization, and the combination of solutes, it is possible to chemically bond formed polymer chains to the surface of the nanomaterial. Further, in the case where the scaffold material is a CNT network, a high nanotube content can allow for the formation of polymers with properties differing from when they are synthesized bulk, including higher crystallinity and/or higher tensile strength.

The nanomaterial that makes up the substrate 110 can have a characteristic pore size that may span a wide range of values, and be either uniform or have a distribution of pore sizes locally or within the span of the material. For example, the substrate 100 can have an average pore size of about 100 nanometers or less, though, in some embodiments, the average pore size can be about 10 nanometers or less, of about 5 nanometers or less, of about 3 nanometers or less, and/or of about 1 nanometer or less. The small pore size can enhance the ability of the nanomaterial to retain solutes and/or other substances therein, though larger substances and compounds may have difficulties entering the substrate at smaller porosity values. Similarly, the substrate 110 can have an average pore size larger than 10 nanometers which allows compounds to travel more easily through the substrate.

Figure 2:
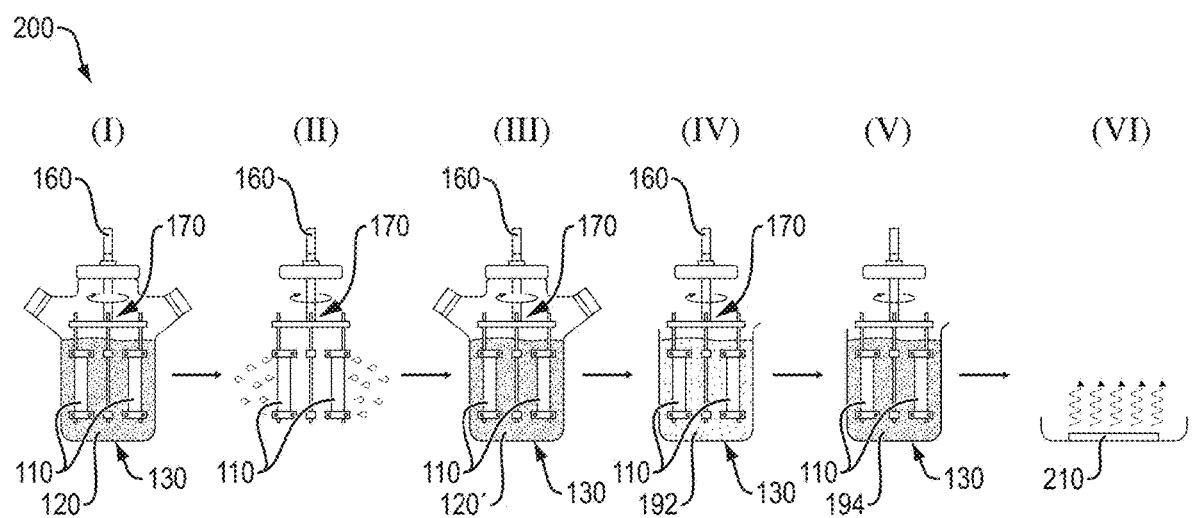
FIG. 2 is a schematic side view of one exemplary embodiment of a sequence of steps of one exemplary method of synthesizing a polymer composite using the devices of FIGS. 1A-1C.

FIG. 2 illustrates an exemplary embodiment of a method 200 for synthesizing a polymer inside a nanoporous medium, e.g., the substrate 110. As shown in (I), the carousel 170 is disposed within the flask 130 such that the substrates 110 are substantially immersed in the first bath of solute solution 120 to allow for transport of the solution throughout the nanomaterial. The carousel 170 can be rotated with respect to the flask, and thus the solution, either via the rotary shaft 160 coupled to the stirrer 140 of the flask 130 or manually, to increase the dynamic nature of the process to expedite transport of the solution through the nanomaterial. Nevertheless, it will be appreciated that in some embodiments the diffusion can be performed statically. It will further be appreciated while the solution travels through the substrate, the solute contained within the solvent 120 can become entrapped within the porosity of the substrate 110 so as to become substantially uniformly distributed from the walls to the center of the substrate.

The time spent in the bath 120 is defined by the duration necessary for the solute to substantially diffuse through the nanoporous structure, where substantial diffusion is at least 95% of the initial porosity is filled with the solution. The amount of time that the substrate 110 is exposed to the solution 120 can vary based, at least in part, on the material of the substrate 110, content of the solution 120, a temperature of the solution 120, ambient temperature, the stirring conditions that can contribute to convection, the solute concentration, and/or the salt content in solution (e.g., pH in the case of an aqueous phase), and so forth. For example, in the case of a CNT substrate immersed in an aqueous solution, the substrate can be disposed in the solution or bath for about 10 minutes, though in some embodiments, the exposure time can be up to about 15 minutes, up to about 20 minutes, up to about 30 minutes, or any amount of time that is sufficient for the solvent 120 to travel throughout the substrate 110, which may include less than 10 minutes, such as about 5 minutes.

Once the solvent has sufficiently transported throughout the substrate 110, the substrate 110 and/or the carousel 170 can be removed from the solution 120 and dried to remove excess liquid from the substrate, while the first solution having the first solute is retained within the network. As shown in (II), the substrates 110 can be removed from the solution 120 and spun or rotated to remove excess solution therefrom, though it will be appreciated that drying can occur in a variety of ways known to one skilled in the art in view of the present disclosures, including by heating, shaking, evaporating, squeezing, and so forth. To minimize drying time, rotating the carousel can effectively substantially remove unwanted solution, though any of the above-mentioned processes can be used.

After the substrate(s) 110 are sufficiently dried, the substrates 110 and/or the carousel 170 can be immersed in a second solvent 120'. For example, the wet substrate(s) 110 having the first solute entrapped within its porosity can be disposed within the second solvent 120' having the second solute therein, as discussed above. The substrates 110 can be stirred while in the solution 120', as shown in (III) to increase the transport of the solution 120' throughout the substrates 110. As the second solvent 120' travels throughout the substrates 110, the first solute within the porosity of the substrates 110 can react with the second solute in the solution 120' to form a polymer within the porous nanostructure of the substrates, as described in greater detail below. In some embodiments, a mechanical force can be applied to the substrate 110 during or after disposing the substrate 110 in the first solvent 120 or in the second solvent 120'. The mechanical force can be tensile or compressive.

The polymerization reaction of the two solutes occurring in situ within the porosity of the substrate 110 can allow the polymer to be more uniformly distributed throughout the nanomaterial. The porosity of the network within the nanomaterial can be narrow, as discussed above, which can prevent polymers from passing therethrough at least because polymer chains can be sized larger than the pores. Moreover, even if the polymer can be introduced through the walls of the substrate 110, it can be difficult to creep the polymer through the body of the nanomaterial into the center at least because the sponge-like shape of many nanomaterials has varying pore sizes and crevices that can hinder movement. A person skilled in the art will recognize that movement of polymer chains through the substrate 110 would likely be slow, as it would take a lot of time polymer chains that contain may monomer units to navigate the inner walls of the substrate. For example, for short oligomers (molar mass approximately 1 kg/mol or less), it can take minutes to reach an infiltration depth of approximately 50 µm into a nanoporous network with a pore size of approximately 10 nanometers, while for longer polymer chains (molar mass approximately 100 kg/mol or more, typical for polystyrene, polyethylene, or polypropylene), infiltrating the same network can take up to a week, or a day if the pore size is larger, e.g., approximately 50 nanometers. These times, while approximate, underscore the challenge of implementing polymer infiltration into nanoporous networks at rates that are practical for industrial processing. It will be appreciated that the above-described infiltration into nanoporous networks follows reputation theory and can be applied to any nanoporous network, e.g., CNTs and the like. Monomers, on the other hand, can be sized on the order of angstroms, which can allow passage through the porosity of the network of the nanomaterial with little resistance.

It will be appreciated that an organic solvent can be used in the solvent 120' when the first solvent 120 is aqueous such that the polymerization reactions takes place between two immiscible solvents. Immiscibility of the solvents allows the solutes contained therein to react quickly and faster than either of the solutes react with the solvents. It will be appreciated that in the case of two miscible solvents, one or more of the solutes would react with the solvent to form a non-reactive species, which will neutralize the solute, thereby preventing a polymerization reaction between the solutes. For example, in a miscible solvent, acyl chloride can react to form a carboxylic acid, which is significantly less reactive and would not polymerize. Moreover, a person skilled in the art will recognize that a polymerization reaction can be a slow-occurring process, which presents challenges for broader applicability and scalability. By undergoing interfacial polymerization, as provided for herein, which is a rapid chemical reaction through which a polymer is formed at the interface between two immiscible phases (liquid-liquid or liquid-solid), the polymerization reaction can happen much more quickly due to the reactivity of the solutes. For example, diamine and acyl chloride are unstable compounds, resulting in a polymerization reaction that occurs substantially instantaneously to form the polymer, which can be orders of magnitude faster than conventional polymerization reactions.

Interfacial polymerization can be used in the textile industry, for example, to produce continuous fibers from polymer systems obtained by poly-condensation, or for coating of wool fabric. Examples of polymers that can be formed through this method include polyamides, polyureas, and polyimides. The polymers can have a high aspect ratio (chain length) and a high degree of crystallinity. In interfacial polymerization reactions, polymers can form a film that synthesizes additional polymer film as the film is pulled and/or collected. Additional details about interfacial polymerization are provided for in U.S. Pat. No. 2,708,617, the disclosure of which is incorporated by reference herein in its entirety. A person skilled in the art understands the processes and techniques used in interfacial polymerization, and thus a detailed description is omitted for the sake of brevity.

Stirring of the solvents 120, 120' can promote interfacial polymerization at a liquid-liquid interface within the porosity of the nanomaterial, and prevent unwanted buildup of the polymer on the edges of the substrate 110. In some embodiments, the polymer can form at the interface between the substrate and the second solvent 120' and/or onto walls of the pores of the nanoporous substrate 110. Stirring can assist in the transport of the second solvent 120' through the porosity of the network of the nanomaterial, thereby preventing the polymer from forming on the nanoporous substrate 110, such as methods known to one skilled in the art for making desalination membranes, and rather allows for polymer formation inside the substrate to create a phase separated system within the nanoporous substrate. A person skilled in the art will recognize that implementations of interfacial polymerization to form polymer composites has not been previously implemented in combination with stirring. For example, formation of polymer-infiltrated CNT composites rapidly and in a scalable manner has previously relied on infiltration with a monomer followed by in-situ polyaddition. In such embodiments, polymerization can be thermally initiated by using benzoyl peroxide or 2,2'-azobisiso-butyronitrile as an initiator, and monomers that undergo free radical bulk polymerization, such as methyl methacrylate (MMA), or styrene can be used.

Moreover, the relationship between solutes and their respective solvents can be chosen based on a type of reaction and/or a desired location of the polymerization reaction within the nanomaterial. For example, formation of the nanomaterial-polymer composite via polymerization of the two immiscible solvents occurs inward such that the polymer is formed within the nanomaterial. Further, in some embodiments, the solute of the first solution 120 has a stronger chemical affinity with the second solution 120' so that the solute can diffuse through the interface of the immiscible liquids and react with the second solute in the organic phase. Diffusivity of the solute of the first solution 120 into the organic phase is faster than the diffusivity of the solute of the second solution 120' into the aqueous phase. It will be appreciated that, in addition to the higher diffusivity values of the solute of the first solution 120 into the organic phase, little to no reaction occurs in the aqueous phase because when the solute of the second solution 120' enters the aqueous phase, it becomes neutralized and no polymerization reaction occurs between the solutes, as discussed in further detail below.

A person skilled in the art will recognize that use of two immiscible solvents refers to a process in which a solvent in the second solution 120' does not, or substantially does not, form a uniform solution with the solvent of the first solution 120 that remains in the substrates 110. While the term "immiscible" is used to describe the relationship between the two solvents, immiscibility is a relative relationship between two solvents based mainly on the relative polarity of the solvents, and thus the term "immiscible" can encompass situations in which the solvents are substantially immiscible, sufficiently immiscible so as to form a liquid-liquid interface within the nanoporous network when the solvents contact one another, and/or be able to sit on top of one another when mixed such that a definitive boundary exists between the two solvents.

Figure 3:
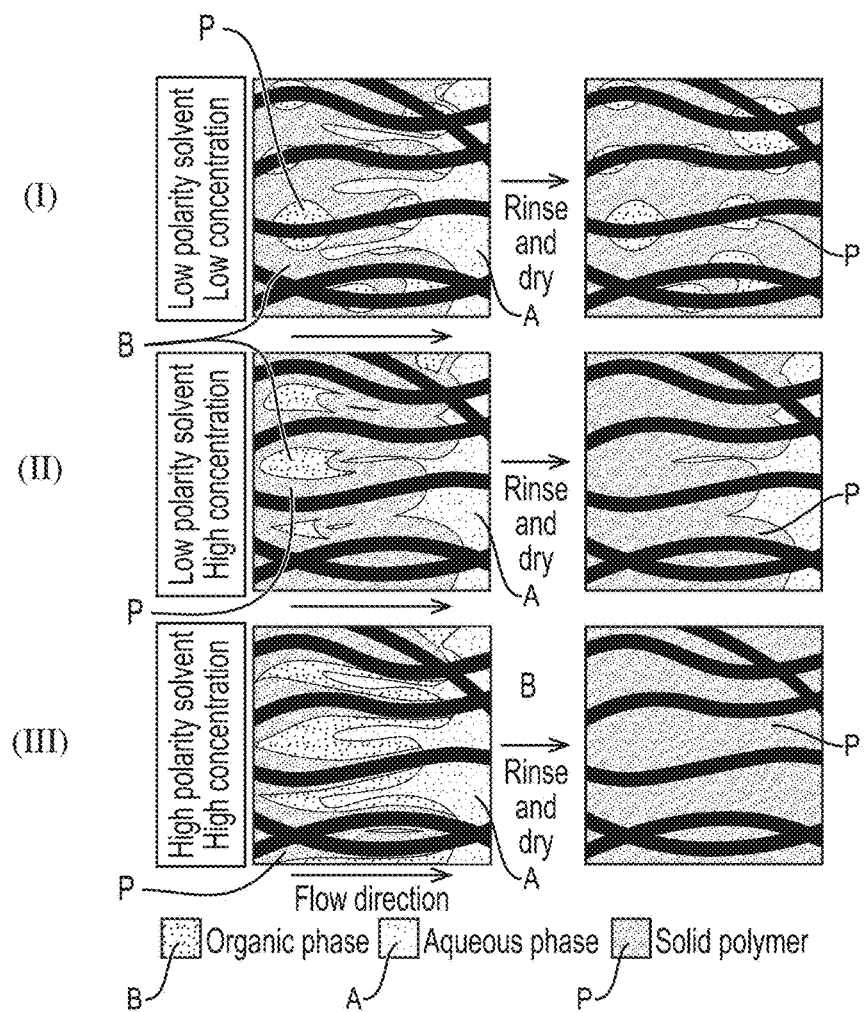
FIG. 3 is a schematic illustration that shows the impact of low polarity and high polarity solvents and low and high solute concentration on a resulting polymer composite.

For example, chloroform and cyclohexanone, each of which can be used as the solvent of the organic phase, can produce composites with different solid structures due to their varying degrees of miscibility with the aqueous solvent of the first solution 120. Chloroform is an example of a low polarity solvent, which makes it more immiscible with water, and cyclohexanone is an example of a high polarity solvent, which makes it less immiscible with water. FIG. 3 illustrates these two materials at varying concentrations of solute to illustrate the relationship between the immiscibility of solvents and/or solute concentrations on the formed polymer composite, thought it will be appreciated that the figure can be applied to any two solvents of varying miscibility with water or each other. As shown in (i), when an aqueous phase (A) is mixed with a low polarity organic phase (B) that is strongly immiscible with water, e.g., chloroform, in the presence of a low concentration of solute, the resultant polymer (P) composite forms only droplets within the nanomaterial network and does not exhibit uniform distribution throughout the network. In such embodiments, the low composite content can be attributed to low availability of solute to polymerize. In (ii), while the concentration of solute is high, the presence of substantial immiscibility of the organic phase (B) with the aqueous phase (A) results in formation of the polymer closer towards the outer surface of the nanomaterial discussed above, or a crust, due to polymer precipitation which is faster than the organic phase transport speed through the network. The presence of substantial immiscibility between the aqueous and organic phases can result in only partial polymer distribution/infiltration, with little to no polymer being formed closer to the center of the network. In (iii), on the other hand, when an aqueous phase (A) is mixed with a high polarity organic phase (B) that is more miscible with water, e.g., cyclohexanone, in the presence of a high concentration of solute, the resultant polymer (P) is uniformly, or substantially uniformly, distributed throughout the nanomaterial network, as the more miscible organic phase transport is faster than polymer precipitation.

Figure 4A:
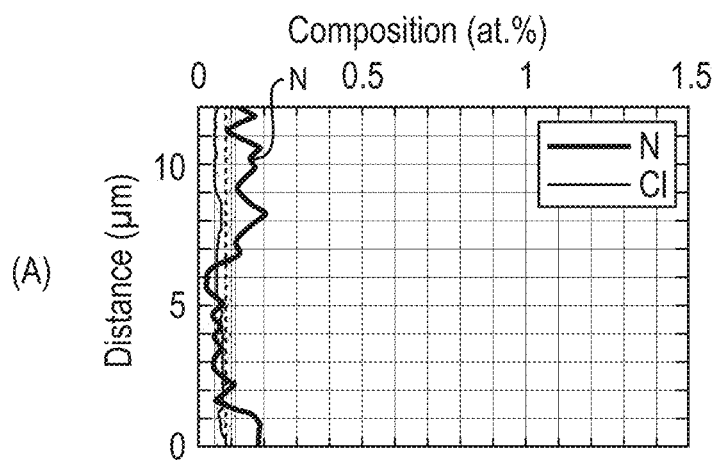
FIG. 4A is a plot illustrating polymer distribution across a thickness of a bare CNT ribbon.
Figure 4B:
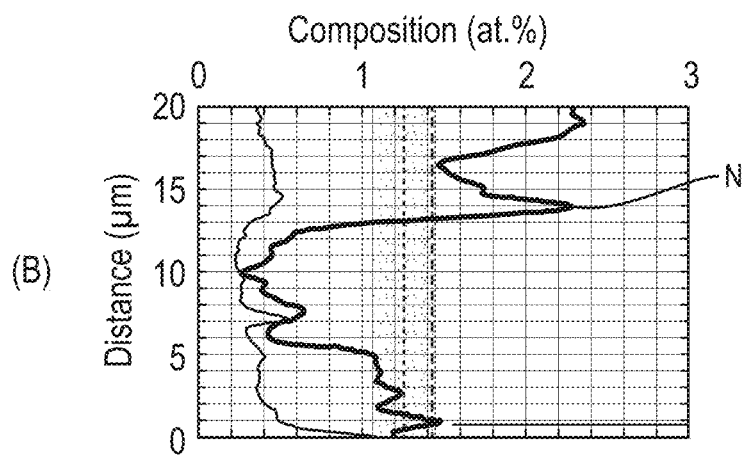
FIG. 4B is a plot illustrating polymer distribution across a thickness of a polymer composite ribbon obtained using chloroform.
Figure 4C:
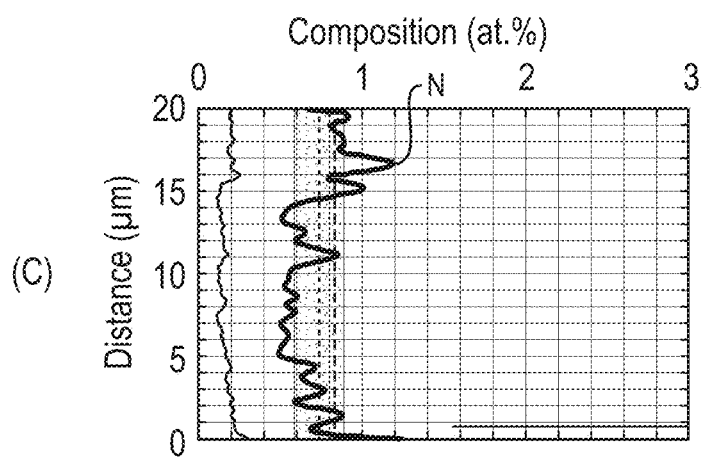
FIG. 4C is a plot illustrating polymer distribution across a thickness of a polymer composite ribbon obtained using cyclohexanone.

FIGS. 4A-4C illustrate EDS plots of polymer distribution across a bare CNT structure (A) and composite ribbons obtained using chloroform (B), and cyclohexanone (C). A person skilled in the art will recognize that tracking nitrogen (N) can provide polymer distribution across a thickness of a sample. As shown in FIG. 4B, chloroform (B), as compared to the bare CNT structure (A), shown in FIG. 4A, and cyclohexanone (C), shown in FIG. 4C, has a greater polymer composition at lower depth on either side of the sample. That is, the chloroform does not penetrate through the network, but rather only travels approximately 5 μm through the network before the polymer closes the porosity, unlike cyclohexanone, which has a uniform polymer distribution throughout the network, as shown by the nitrogen line remaining substantially flat throughout the distance shown in FIG. 4C.

Figure 5A:
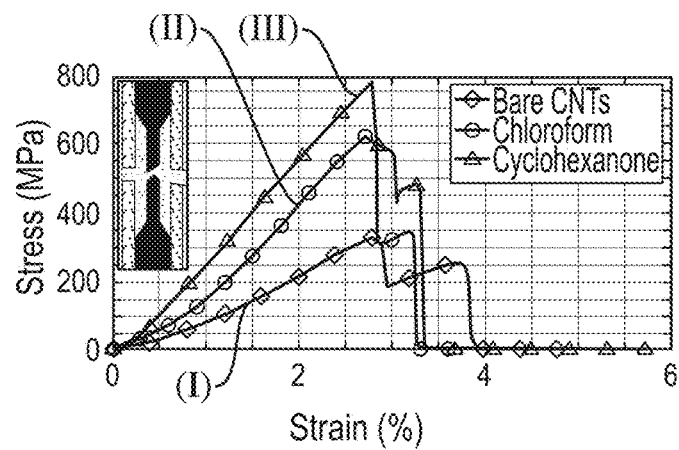
FIG. 5A is a graph illustrating stress-strain curves for a bare CNT structure as well as CNT-polymer composites.
Figure 5B:
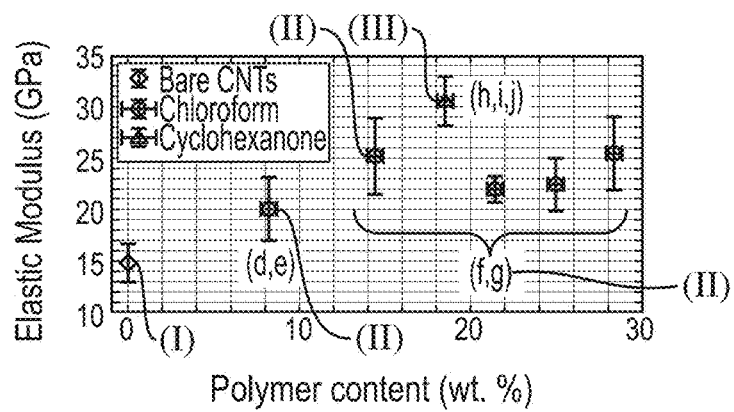
FIG. 5B is a graph illustrating values of elastic modulus as a function of polymer content with respect to the compounds of FIG. 4A.
Figure 5C:
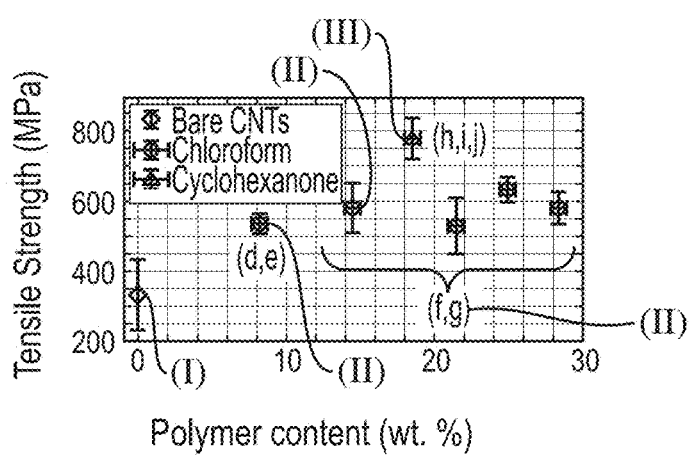
FIG. 5C is a graph illustrating values of tensile strength as a function of polymer content with respect to the compounds of FIG. 4A.

FIGS. 5A-5C illustrate the effects that chloroform, and cyclohexanone have on various properties of the final nanomaterial-polymer composites. For example, FIG. 4A illustrates a stress-strain comparison for a bare CNT structure (I), chloroform (II), and cyclohexanone (III). As shown, cyclohexanone (III) has a higher stress than either of chloroform (II) and the bare CNTs (I). FIGS. 4B and 4C show the evaluation of the elastic modulus and the tensile strength, respectively, graphed along the y-axis against polymer content for each of the three compounds of FIG. 4A, shown graphed on the x-axis.

A person skilled in the art will recognize that although the first solvent 120 and the second solvent 120' discussed herein are water and an organic solvent, respectively, in some embodiments the organic solvent can be the first solvent and the aqueous solvent can be the second solvent. The solvent can be chosen based on one or more parameters of the system, including but not limited to the desired rate of the reaction, the type of substrate and nanomaterial network, and so forth. For example, when the nanomaterial is hydrophobic, such as carbon nanotubes (CNTs) or hydrophobic polymer nanofibers (e.g., polyvinylidene fluoride, and polyacrylonitrile), and so forth, the second solvent being the organic solvent allows it to travel through the hydrophobic medium faster, thereby increasing the rate of the polymerization reaction while allowing the second solvent to quickly infiltrate the substrate to result in polymer composite with uniform morphology. A quick transport is one in which the solvent travels through the nanomaterial network at a rate greater than the rate of interfacially polymerized polymer precipitation. A person skilled in the art will recognize that the latter-introduced solvent into the nanomaterial network should be the solvent that travels through the network faster. As the solvent is introduced, the solutes between the solvents react in a polymerization reaction. The surface energy of the second solvent 120' is lower than the energy of the first solvent 120 with respect to the network so that the second phase can completely fill the nanoporous network before the precipitated polymer closes the porosity. In embodiments in which the solvent travels at a slower rate, the speed of the polymerization reaction would form polymers more quickly than the solvent transports through the network, preventing uniform distribution of the polymer throughout the network and/or resulting in formation of a crust that is more akin to formation of desalination membranes, as discussed above. Alternatively, when forming a polymer composite using cellulose, which is hydrophilic, as the substrate, the organic phase is introduced prior to the aqueous phase at least because the increased speed of transport of the aqueous phase through the hydrophilic network.

With respect to cellulose, the cellulose molecule can be a linear polymer with a repeating unit that includes two anhydroglucose rings, $(C_6H_{10}O_5)_n$ where n=10,000 to 15,000, that can be linked by covalent bonds. Cellulose can a preferred material because it is the primary reinforcement phase of many biological organisms, including trees, plants, algae, some sea creatures, and bacteria, and is also the most abundant organic polymer on Earth.

One having skill in the art will appreciate that in some embodiments, cellulose acetate, which is a functionalized form of cellulose, can be used instead of cellulose. Both cellulose and cellulose acetate are biocompatible, biodegradable, pleasant to the touch, and inexpensive. Both molecules are also compostable, dry quickly, are shrink, mildew, and moth resistant, are washable or dry cleanable, and are easily dyed. Cellulose acetate differs from cellulose in that approximately ⅔ of the hydroxyl groups on the cellulose molecule have been replaced by acetate groups. While this can reduce the number of hydrogen bonds in the material, and thus its tensile strength, the cellulose acetate is hydrophilic, has high surface area, and absorbs organics, allowing it to be used to produce specially structured separation membranes or even implantable sensors/filtration devices. It is also strongly dielectric and can be used to produce actuators in prostheses, as well as in robotics or haptic interfaces.

The use of interfacial polymerization as an in situ polymerization method within nanomaterial assemblies provides versatility in the choice of the formed polymer and its properties. For example, the solute systems used in interfacial polymerization can be tuned independently. By way of further example, using two aromatic polymers can produce a fully aromatic polyamide with a high degree of crystallinity, very high thermal stability, and strong mechanical properties, while swapping one of those aromatic solutes for an aliphatic compound would contribute to improving the ductility of the final composite. Interfacial polymerization can also result in tunability of the polymer content and porosity of the final composite. Indeed, by adjusting the solute concentration in the two solutions, the temperature of the baths, and the immersion time, a wide range of hierarchical nanomaterials-based composites with morphologies ranging from partially infiltrated, nanoporous networks up to dense, fully infiltrated, and homogeneous composite systems, e.g., CNT/polyamide composites featuring >70 wt. % CNTs uniformly coated and infiltrated with polymer can be formed. By way of further example, the reaction rate of the polymerization reaction can be tuned by adjusting the nature of the functional groups of the reacting solutes. For example, in some embodiments, such as those in which the hydrophilicity/hydrophobicity of the nanomaterial prevents rapid transport through the network, bromine functional groups can be used instead of chlorine functional groups to reduce the speed of the polymerization reaction.

In some embodiments, one or more rate constants can be tuned to affect a final composition of the polymer composite as desired. For example, for substantially uniform polymer distribution throughout the network, akin to cyclohexanone, a rate constant of solvent transport can be set at a value greater than a rate constant of polymerization. In such embodiments, the solvent can travel through the network faster than the speed at which polymerization occurs, allowing the polymer to form throughout the nanoporous network. Alternatively, for non-uniform polymer distribution throughout the network, akin to chloroform, the rate constant of polymerization can be set at a value greater than a value of a rate constant of solvent transport, aggregating a larger amount of polymer on the edges of the network while the center remains substantially free from polymer.

The polycondensation reaction occurs when the two solute phases are in contact as the material goes through the second bath, e.g., bath containing the second solvent 120'. The time spent in the second bath 120' can affect the final degree of polymerization of the obtained macromolecules. As discussed above, reaction time and final molecular weight can be adjusted by tuning the temperature and stirring condition of the bath, the solute types and concentrations in both solutions, as well as the nature of the solvents. For example, referring to FIG. 2, the amount of time that the substrate is exposed to the organic solvent can vary based, at least in part, on the material of the substrate, content of the solution, a temperature of the solvent, ambient temperature, and so forth. For example, in the case of a CNT substrate immersed in an aqueous solution, the substrate can be disposed in the first bath for about 5 minutes, though in some embodiments, the exposure time can be up to about 7 minutes, up to about 8 minutes, up to about 10 minutes, or any amount of time that is sufficient for the organic solvent to travel throughout the substrate and react with the first solute to form the composite.

A person skilled in the art will recognize that although the instantly illustrated process shows the substrates 110 being immersed in each of the solvents 120, 120' a single time, in some embodiments the substrates can be disposed in one or more of the solvents a plurality of times to form the composite. For example, the instantly disclosed process can include repeatedly exposing the substrate to one or more of the first solvent 120 or the second solvent 120' to increase a final polymer content of the polymer composite. The substrate 110 can be exposed to multiple aqueous solvents sequentially by dipping the substrate into a single bath a plurality of times, reintroducing the substrate into the first solvent 120 after being removed from the second solvent 120', and/or a combination of dipping the substrate into a single bath a plurality of times and reintroducing the substrate into the first solvent 120 after being removed from the second solvent 120'.

Once the polymerization reaction between the solutes has occurred, the substrates 110 can be removed from the organic solvent and cleaned. Cleaning can be performed in one or several steps in which the composite is exposed to compounds that remove any byproducts and/or unreacted solutes remaining within the composite. For example, as shown, the composite can be immersed in an aqueous bath 192, e.g., in water, to remove any byproduct, as shown in (IV), and/or immersed in an acetone bath 194 to remove any untreated solutes, as shown in (V). As with the previous steps discussed with respect to this method, the amount of time that the substrates 110 are exposed to the second solvent 120' can vary based, at least in part, on the material of the substrate, content of the solution, a temperature of the solvent, ambient temperature, and so forth. After the unwanted substances are removed, the composite 210 can be placed in the ambient environment to dry in air, as shown in (VI).

Figure 6:
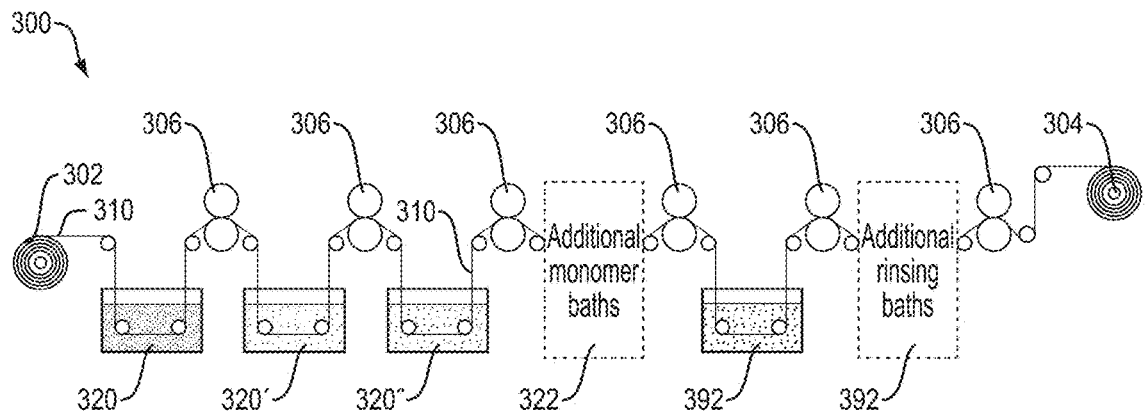
FIG. 6 is a schematic side view of an exemplary embodiment of a continuous process of synthesizing a polymer composite.

In some embodiments, interfacial polymerization can be scaled and integrated in a roll-to-roll production line. This can be beneficial in view of the speed at which chemical reactions can occur during interfacial polymerization. For example, FIG. 6 illustrates an embodiment of a continuous process that can be performed with high scalability to produce nanomaterial-polymer composites through in situ interfacial polymerization. A person skilled in the art will recognize that a continuous process refers to a process in which a substrate can be escorted from a dispending source through various baths and/or solvents provided herein. While the term "continuous" can be used to describe this process, a person skilled in the art will understand that instances in which the source can stop and start to pause the exposure time of the substrate in a particular bath or to refill may be desirable, and thus the term "continuous" can encompass situations in which the substrate stops or is paused for a time needed to promote the reaction and/or install a new roll of substrate to be delivered throughout the system.

For example, the process shown in FIG. 6 illustrates a roll-to-roll production line or an automated dipping mechanism. As shown, the nanoporous material 310 can be dispensed continuously from a ribbon or wheel 302 and cycled through sequential dipping and drying steps to create meters of composite. In some embodiments, the production line can follow a pre-programmed sequence. For example, in some embodiments, the diffusion of the solute through the material 310 and/or the reaction on the solutes can be set at the time taken for the substrate to pass through the baths 320, 320', 320".

As shown, in the continuous process 300, a CNT nanoporous material 310 (e.g., fiber, ribbon, bucky paper, or weave) can be run from the ribbon 302 to a collecting roll 304. The material 310 can be first run successively through two baths containing two solute solutions 320, 320' used for interfacial polymerization. The material 310 can be run multiple times through the two solute baths to increase the final polymer content of the composite. The process 300 can include one or more drying rolls 306 disposed therebetween for drying the material 310 before disposing it in a subsequent solvent. In some embodiments, the material 310 can be run through a third solution 320" having a variation of one or more of the first solvent and/or the first solute. Subsequently, the obtained composite system is run through one or more rinsing baths 392 before being collected and left to dry.

In an exemplary embodiment for the polymerization of an aromatic polyamide at room temperature within a CNT sheet, one bath features an aqueous solution containing about 10 mg/mL of m-phenylene diamine, while the other bath contains an organic phase containing about 10 mg/mL of trimesoyl chloride in hexane. The CNT starting material can be first dipped in the aqueous bath for about 20 minutes, or another time sufficient to ensure that the first solution travels through the porosity. The material can be taken out of the first bath and excess liquid at the surface can be removed before transferring the wet CNT material to the second bath, where it is left to react for about 20 minutes, or another time sufficient for the first and second solutes to react with one other. The final composite then undergoes subsequent rinses, which can occur for a few seconds or more in hexane and ethanol, before being left to dry at room temperature for about three hours or longer (although shorter drying times are also possible). The sequence of baths (from the dipping in the diamine solution to the drying at room temperature) can be repeated several times, e.g., three or more, to obtain a dense CNT/polymer composite having up to 91 wt. % CNTs.

A person skilled in the art will recognize that the number of baths can depend, at least in part, on the desired architecture of the final composite, e.g., featuring one polymer or more, partially or fully infiltrated network. For example, composite systems involving more than one polymer system can be fabricated by dipping the scaffold material in an initial set of two solute baths to form a first polymer, followed by another dipping cycle in a second set of two solute baths 322 to synthesize an additional polymer. In some embodiments, the additional solute baths 322 can allow for cycling the nanoporous material through the same two solute baths to increase the polymer content of the final composite. The temperature of each bath, and the temperature of the nanoporous material, may be varied throughout the process, with the temperature of the nanoporous material being able to be controlled independently of the bath. Multiple polymers may be synthesized sequentially in such a continuous process and directed fluid flows and/or electric fields may be used to assist infiltration and/or accelerate or moderate the polymerization process.

Figure 7:
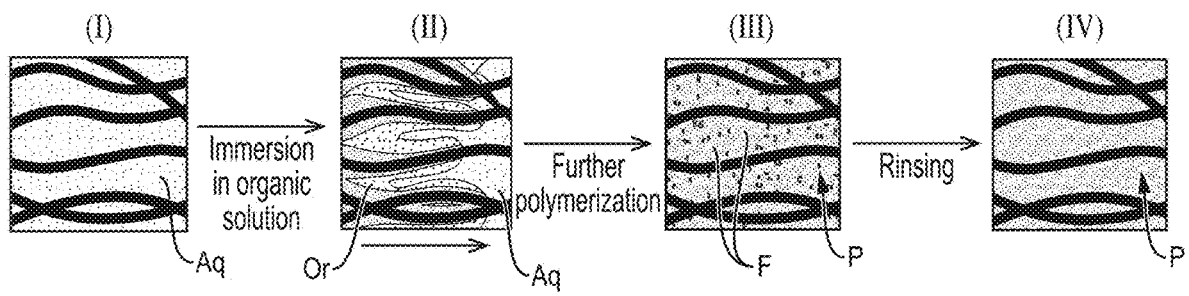
FIG. 7 is a schematic detailed illustration of the nanomaterial network throughout a process of synthesizing the polymer composite.

The graphic in FIG. 7 illustrates an embodiment of the polymerization reaction disclosed in FIG. 2 in greater detail. For example, an in situ interfacial polycondensation reaction in the formation of polyamides can proceed as follows:

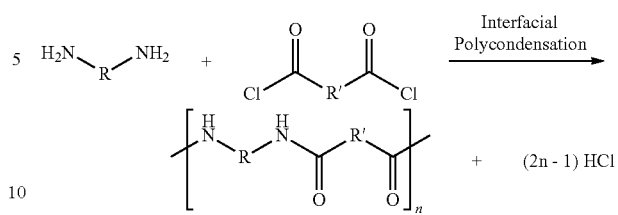

(Eq. 1)

where

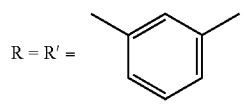

though it will be appreciated that each of R and R' can represent a different compound, or in some embodiments, can be different compounds from one another. It will be appreciated that although the process will be described in view of the above solutes and solvents, the disclosure can generally be applied to any of a variety of solutes and solvents, unless indicated otherwise, to produce various polymers, e.g., polyurea, polyimide, and so forth.

As shown in (I) of FIG. 7, the aqueous solution (Aq) of diamine monomer can be distributed throughout the nanomaterial such that the monomer is dispersed throughout the porosity. When the nanomaterial is exposed to the organic solution (Or) that contains acyl chloride monomer dissolved in the organic solvent, the organic solvent can displace the water and the polymerization reaction can begin to occur. As shown in (II), the diamine monomer and the acyl chloride monomer can react substantially immediately to form the polyamide (P) within the nanomaterial. It will be appreciated that the polymerization reaction occurs in the organic solvent, and the organic solvent is chosen such that the diamine monomer, or any solute that is used in the aqueous solvent, can diffuse into the organic solvent. Further, it will be appreciated that the organic solvent can be selected to be immiscible with the aqueous solvent of the diamine monomer solution for reasons discussed above. The solubility of the diamine monomer in the organic solvent can allow the diamine to pass into the organic solvent to polymerize therein, as shown in greater detail in FIG. 8.

Figure 8:
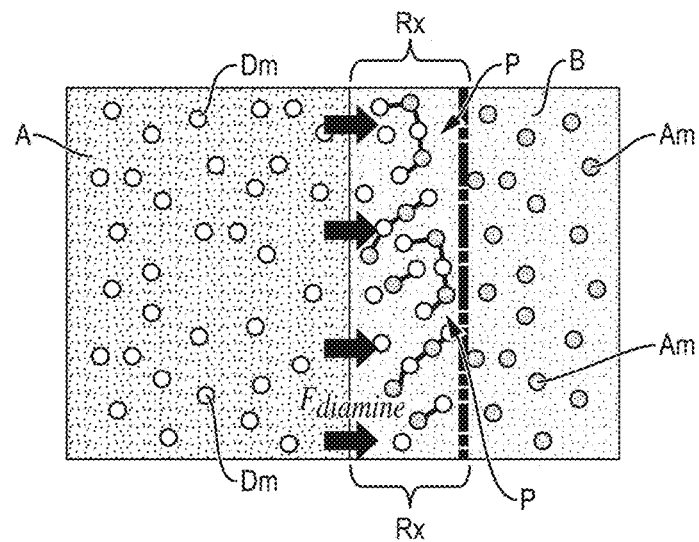
FIG. 8 is a schematic illustration of a solute diffusing across the interface between two immiscible liquids to engage in a polymerization reaction.

More specifically, FIG. 8 illustrates a phase separated system formed between two immiscible liquids. For example, when water (A) and the organic solvent (B), e.g., hexane, are mixed together, they do not mix, instead forming a liquid-liquid interface within the nanoporous network, as shown. The solubility of the diamine monomer (Dm) in the organic solvent allows the diamine (Dm) to travel across the phase separated system, or interface between the solvents, into the organic solvent (B) to react with the acyl chloride monomer (Am) contained therein. The travel of the diamine monomer (Dm) into the organic solvent (B) can create a reaction zone Rx within the organic solvent (B), as shown, with the polymer reaction and the resulting polymer being formed within the reaction zone.

Referring to Eq. 1, the polymerization reaction can produce hydrochloric acid and/or other impurities (F) as a byproduct of the reaction in addition to the polyamide polymer. As exposure time to the organic solvent increases, increased amounts of the diamine react with the acyl chloride to form polymer (P) within the network, as shown in (III). Once the reaction has progressed to substantial completion, the polymer composite can be rinsed in water to eliminate the byproduct and any unreacted monomers to produce the polymer composite, as shown in (IV). The polymer composite can then be dried to remove any excess solvents, e.g., water, acetone, and so forth.

The illustrated and described systems, devices, methods, configurations, shapes, and sizes are in no way limiting. A person skilled in the art, in view of the present disclosures, will understand how to apply the teachings of one embodiment to other embodiments either explicitly or implicitly provided for in the present disclosures. Further, a person skilled in the art will appreciate further features and advantages of the present disclosure based on the above-described embodiments. Accordingly, the disclosure is not to be limited by what has been particularly shown and described, except as indicated by the appended claims. All publications and references cited herein, including the aforementioned document and provisional application, are expressly incorporated herein by reference in their entirety.

What is claimed is:

1. A method of synthesizing a polymer within a nanoporous medium, comprising:
    exposing a nanoporous substrate to a first solvent having a first solute dissolved therein to allow the first solvent and solute to infiltrate the nanoporous substrate; and
    exposing the nanoporous substrate to a second solvent having a second solute dissolved therein to allow the second solvent and solute to travel through the porosity of the nanoporous substrate to react the second solute with the first solute to form the polymer,
    wherein the second solvent is sufficiently immiscible with the first solvent.

2. The method of claim 1, wherein the second solvent travels through the porosity of the nanoporous substrate faster than the first solvent travels through the porosity of the nanoporous substrate.

3. The method of claim 1, wherein at least one of the first solute or the second solute comprises one or more of a monomer, a mixture of monomers, an oligomer, a mixture of oligomers, or a mixture of a monomer and an oligomer.

4. The method of claim 1, further comprising stirring the substrate while the substrate is exposed to the second solvent to assist the transport of the second solvent through the substrate where the first solute reacts with the second solute to form the polymer.

5. The method of claim 1, wherein the polymer is formed at the interface between the first and second solvents or at the interface between the substrate and the second solvent while the substrate is disposed in the second solvent.

6. The method of claim 1, further comprising:
    rinsing the substrate in one or more additional solvents to remove byproduct or unreacted solutes therefrom,
    wherein the one or more additional solvents comprises at least one of acetone or water.

7. The method of claim 1, wherein the substrate is dried between exposure to the first solvent and exposure to the second solvent.

8. The method of claim 1, further comprising repeatedly exposing the substrate to at least one of the first solvent or the second solvent to increase a final polymer content of the polymer within a nanoporous medium.

9. The method of claim 1, wherein the first solvent comprises water and the second solvent comprises an organic solvent.

10. The method of claim 1, further comprising drying the substrate after removing the substrate from the first solvent and prior to disposing the substrate in the second solvent.

11. The method of claim 1, wherein the substrate comprises one or more of cellulose, ceramic, metal, polymer, carbon nanotubes, graphene, silicon nanowires, or boron nitride nanotubes, in the form of a powder, foam, lattice, sheet, or yarn.

12. The method of claim 1, wherein a spacing between adjacent nanostructures in the nanoporous substrate is approximately in the range of about 1 nanometer to about 100 nanometers.

13. A method of synthesizing a polymer composite, comprising:
    disposing a nanomaterial substrate having a porous structure in a first bath that contains a first solvent, the first solvent having a first solute dissolved therein;
    removing the substrate from the first bath; and
    disposing the substrate in a second bath that contains a second solvent, the second solvent having a second solute dissolved therein to react the first and second solutes to form a polymer composite,
    wherein the second solvent is sufficiently immiscible with the first solvent.

14. The method of claim 13, wherein the polymer composite forms at the interface between the first and second solvents or at the interface between the substrate and the second solvent while the substrate is disposed in the second solvent.

15. The method of claim 13, further comprising repeatedly disposing the substrate into at least one of the first bath or the second bath to increase a final polymer content of the polymer composite.

16. The method of claim 13, further comprising stirring the substrate in the second bath to assist the transport of the second solvent through the substrate and to react the first solute with the second solute to form the polymer composite.

17. The method of claim 13, wherein a mechanical force is applied to the substrate during or after disposing the substrate in the first bath or in the second bath.

18. The method of claim 17, wherein the mechanical force is tensile or compressive.

19. The method of claim 13, wherein the second solvent wets the substrate after the substrate is disposed therein, causing the first solvent to be substantially displaced from the substrate.

20. A polymer composite, comprising:
    a nanoporous material having a polymer substantially uniformly distributed throughout a structure thereof, the polymer being formed from a reaction of a first solute and a second solute within pores of the nanoporous material at a liquid-liquid interface within the nanoporous material.

* * * * *